United States Patent
Patrick

(10) Patent No.: US 12,280,614 B2
(45) Date of Patent: Apr. 22, 2025

(54) FARM IRRIGATION WHEEL

(71) Applicant: Shark Wheel, Inc., Lake Forest, CA (US)

(72) Inventor: David M. Patrick, Ladera Ranch, CA (US)

(*) Notice: Subject to any disclaimer, the term of this patent is extended or adjusted under 35 U.S.C. 154(b) by 453 days.

(21) Appl. No.: 17/653,158

(22) Filed: Mar. 2, 2022

(65) Prior Publication Data

US 2022/0266625 A1    Aug. 25, 2022

Related U.S. Application Data

(63) Continuation-in-part of application No. 17/189,645, filed on Mar. 2, 2021, now Pat. No. 12,043,059, which is a continuation-in-part of application No. 15/979,429, filed on May 14, 2018, now Pat. No. 10,933,687.

(51) Int. Cl.
*B60B 15/22* (2006.01)
*B60B 15/02* (2006.01)
*A01G 25/09* (2006.01)

(52) U.S. Cl.
CPC ............ *B60B 15/22* (2013.01); *B60B 15/025* (2013.01); *A01G 25/09* (2013.01); *B60Y 2200/224* (2013.01)

(58) Field of Classification Search
CPC ....... B60B 15/22; B60B 15/025; B60B 15/18; B60B 15/20
See application file for complete search history.

(56) References Cited

U.S. PATENT DOCUMENTS

| | | | |
|---|---|---|---|
| 366,243 | A | 7/1887 | Peacock |
| 555,330 | A | 2/1896 | Price |
| 836,578 | A | 11/1906 | De Hora |
| 1,085,700 | A | 2/1914 | Percy |
| 1,235,597 | A | 8/1917 | Raflovich |
| 1,309,006 | A | 7/1919 | Allen |
| D54,288 | S | 12/1919 | Stothoff |

(Continued)

FOREIGN PATENT DOCUMENTS

JP    61175101    * 8/1986    ............. B60B 15/04

OTHER PUBLICATIONS

International Search Report, World Intellectual Property Office, Mar. 2, 2022.

(Continued)

*Primary Examiner* — Jason R Bellinger
(74) *Attorney, Agent, or Firm* — CIONCA IP Law P.C.

(57) ABSTRACT

A wheel having a circular ring is provided. The circular ring has a rotational axis and an outer surface. A plurality of lugs is mounted in side-by-side positions on said outer surface of the circular ring. Each lug of the plurality of lugs has: a center rib, a first leg and a second leg, each leg extending from the center rib laterally and opposite of each other, and a lug plate adapted to connect the first leg to the center rib. The outermost point of each center rib may form a circular pattern that is coaxial with the rotational axis. The wheel may have a rim nested within said circular ring, said rim having a plurality of alternating scalloped protrusions, wherein said rim is configured to provide suitable clearance for tools during lug installation and removal while increasing the load capacity of said wheel.

18 Claims, 24 Drawing Sheets

(56) References Cited

U.S. PATENT DOCUMENTS

| | | | |
|---|---|---|---|
| 1,352,635 A | | 9/1920 | Stothoff et al. |
| 1,414,537 A | | 5/1922 | Willig |
| 1,488,778 A | | 4/1924 | Cohen |
| 1,563,679 A | | 12/1925 | Wilmot |
| 1,586,930 A | | 6/1926 | Wine |
| 1,622,111 A | | 3/1927 | Hawkins |
| 1,742,100 A | | 12/1929 | Rozankovich |
| 2,068,645 A | * | 1/1937 | Henneuse ............... B60B 15/18 305/4 |
| 5,046,785 A | | 9/1991 | Bockerman |
| 5,078,454 A | | 1/1992 | Rollinson |
| 5,154,490 A | | 10/1992 | Burns |
| 5,353,853 A | | 10/1994 | Hansson |
| 5,390,985 A | | 2/1995 | Chandler |
| 6,637,828 B2 | | 10/2003 | Braunschweiler |
| 7,980,282 B2 | | 7/2011 | Moyna et al. |
| 8,657,215 B1 | | 2/2014 | Blum |
| 9,272,571 B2 | | 3/2016 | Niblock |
| 9,283,810 B2 | | 3/2016 | Korus et al. |
| 9,539,856 B2 | | 1/2017 | Visscher |
| 10,118,444 B2 | | 11/2018 | Abe |
| 10,933,687 B1 | * | 3/2021 | Patrick ................... B60B 15/20 |
| 10,994,571 B2 | | 5/2021 | Beck |
| 2016/0037703 A1 | | 2/2016 | Cook |
| 2017/0174005 A1 | | 6/2017 | Van Riper et al. |
| 2020/0031163 A1 | | 1/2020 | Waldner |
| 2021/0178809 A1 | * | 6/2021 | Mesinovic ............ B60B 15/025 |
| 2022/0266625 A1 | | 8/2022 | Patrick |
| 2024/0042796 A1 | * | 2/2024 | Fleishman ................ B60C 7/22 |

OTHER PUBLICATIONS

European Patent Office, Extended European Search Report for European Patent Application No. 22764263.4, Dec. 18, 2024, Munich, Germany.

* cited by examiner

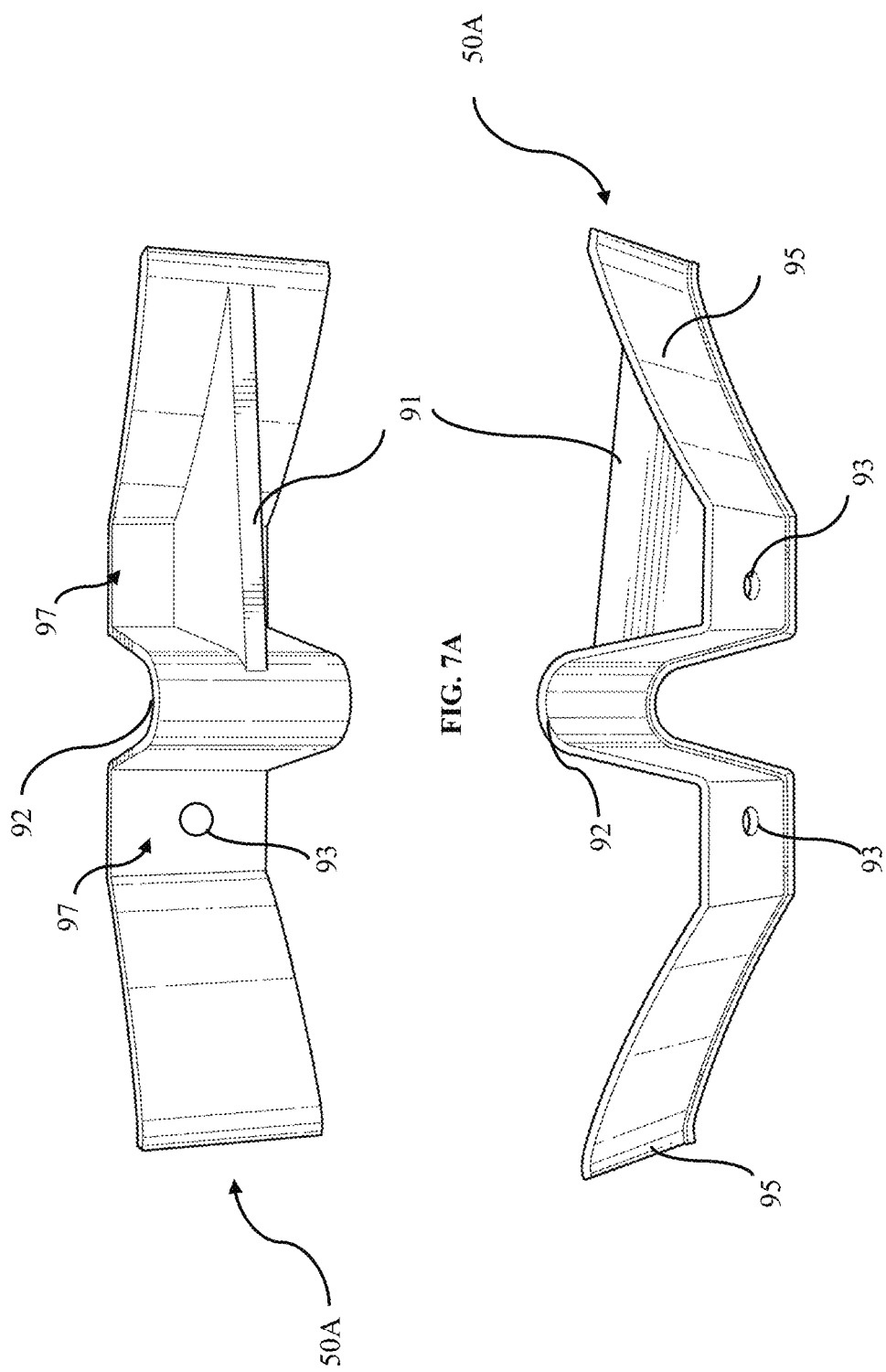

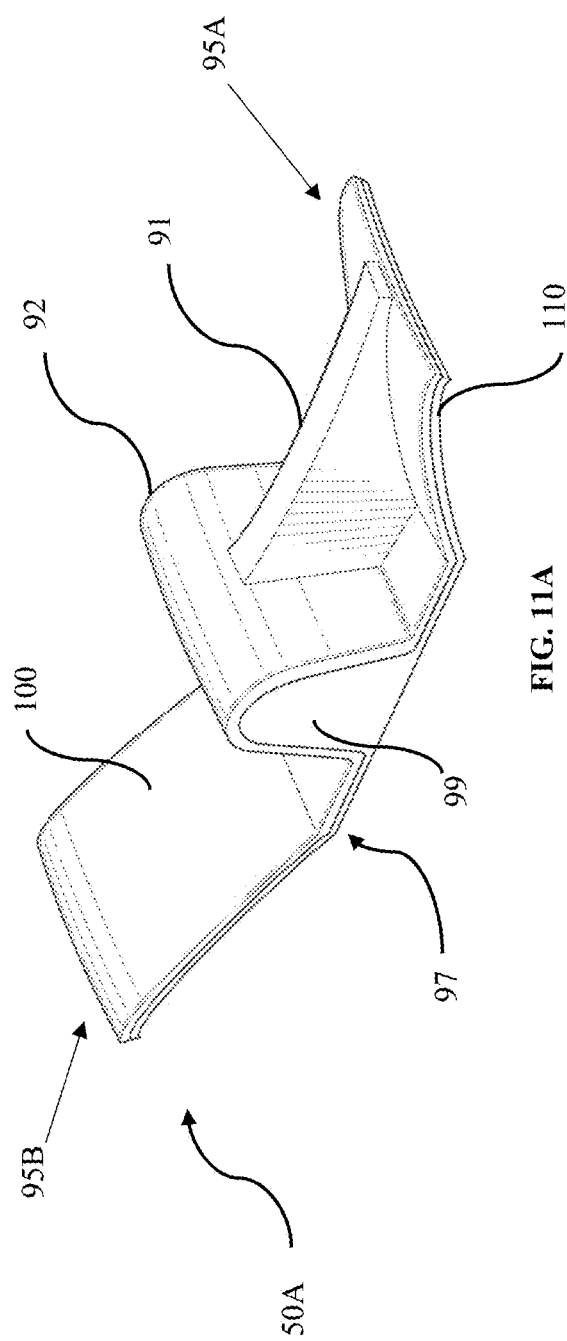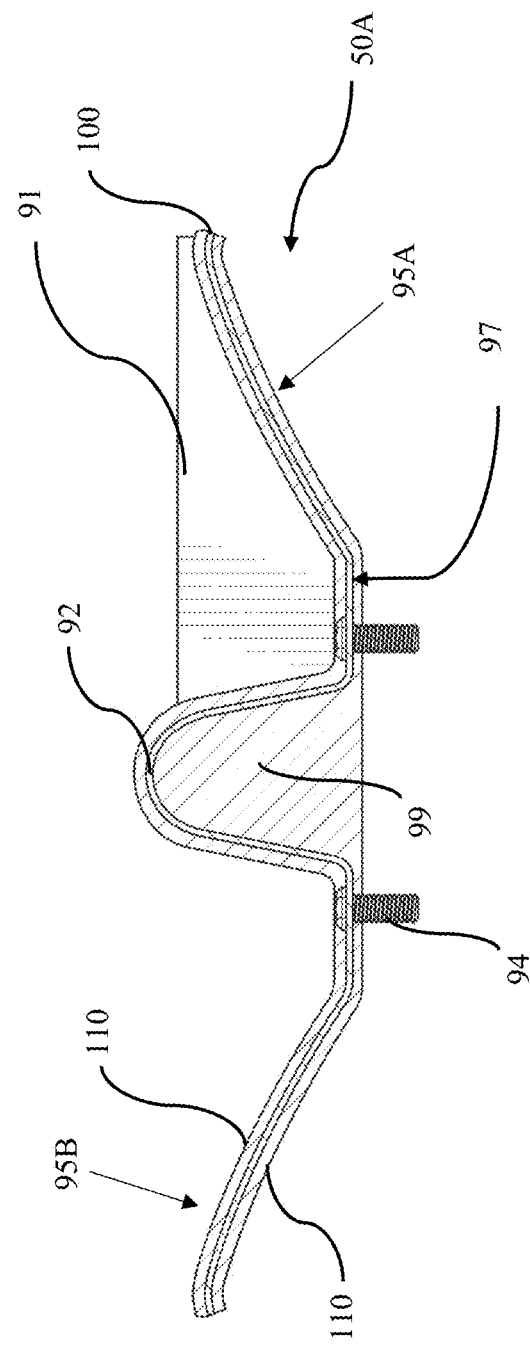
FIG. 11A
FIG. 11B

FARM IRRIGATION WHEEL

CROSS-REFERENCE TO RELATED APPLICATIONS

This application is a continuation-in-part and claims the benefit of U.S. Non-Provisional application Ser. No. 17/189,645, filed on Mar. 2, 2021, which has matured into U.S. Pat. No. 12,043,059, which is a continuation-in-part of U.S. Non-Provisional application Ser. No. 15/979,429, filed on May 14, 2018, which has matured into U.S. Pat. No. 10,933,687, both of which are hereby incorporated by reference, to the extent that they are not conflicting with the present application.

BACKGROUND OF INVENTION

1. Field of the Invention

The invention relates generally to utility wheels and more particularly, to wheels used in farming applications, such as wheels used in conjunction with crop irrigation equipment.

2. Description of the Related Art

Currently, center pivot irrigation is a form of overhead sprinkler irrigation, which uses a machine having pipe segments arranged in linear arms, with sprinklers positioned along the arms which may be supported by trusses mounted on wheeled units with such units set at several points along the arms. In one version, the arms are driven in a circular pattern and fed with water from a pivot point at the center of the circle. For a center pivot to be used, the terrain upon which it rotates must be reasonably flat; but may move over an undulating surface. The arms typically may be between 1200 and 1600 feet in length forming a circle radius. These systems may be water-powered, hydraulic powered or electric motor-driven. The outermost wheels set the pace of rotation with a full circle made once every three days for example. The inner wheels are auto-controlled to keep the arms relatively linear during movement. Sprinkler sizes are progressively larger over the distance from the pivot point to the outer circumference of the circle. Crops may be planted in straight rows or in circles to conform to the travel of the irrigation system.

Additionally, center-pivot irrigation typically uses less water and require less labor than furrow irrigation. This results in lower labor costs, reduces the amount of soil tillage required, and helps reduce water runoff and soil erosion. Less tillage also encourages more organic materials and crop residue to decompose back into the soil and reduces soil compaction. Inflatable tires are widely used on center-pivot irrigation rigs because they have excellent performance on soft soil and mud due to their compliance causing flattening as they roll in contact with a surface. During flattening the tire's footprint (contact surface) grows, thereby reducing contact pressure and reduced contact pressure reduces the tendency to sink into the ground ruts are less pronounced.

Furthermore, current center pivot irrigation wheels lack strength and durability in the wheels because of pneumatic tires typically used. Moreover, current center pivot irrigation wheels also do not have any traction support for once the wheel has already entered a rut. Pneumatic tires in the irrigation application also require air pressure maintenance due to air loss and typically have rutting issues.

Therefore, there is a need to solve the problems described above by proving a device for improved traction for crop irrigation equipment.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a wheel is provided, the wheel comprising: a circular ring having: an outer surface; and a rotational axis; and a plurality of lugs mounted in side-by-side positions on said outer surface of the circular ring, each lug having: a center rib, a first leg and a second leg, each leg extending from the center rib laterally and opposite of each other, and a lug plate adapted to connect the first leg to the center rib; wherein the plurality of lugs forms a circular pattern that is coaxial with the rotational axis. Thus, an advantage is that the wheel will have enhanced traction due to the lugs having a protruding lug plate to better grip the driving surface. Another advantage is that the lug plates may provide structural support to the lugs, increasing their strength. Another advantage is that each lug may be provided with an overmolded rubber layer which may increase lug strength and durability, enhance lug grip, and/or protect internally enclosed lug structures. Another advantage is that modular implementation of the lugs may allow for easy maintenance, repair, or replacement of said lugs as needed, rather than replacement of the whole wheel. Another advantage is that the disclosed wheel may utilize a disk having scalloped portions, wherein said scalloped portions allow for easier manipulation of lugs and provide enhanced load bearing capabilities to said wheel.

In another aspect, a wheel is provided, the wheel comprising: a plurality of lugs mounted in side-by-side positions to form a circular ring, each lug having: a center rib, a first leg and a second leg, each leg extending from the center rib laterally and opposite of each other, and a lug plate adapted to connect the first leg to the center rib. Again, an advantage is that the wheel will have enhanced traction due to the lugs having a protruding lug plate to better grip the driving surface. Another advantage is that the lug plates may provide structural support to the lugs, increasing their strength. Another advantage is that each lug may be provided with an overmolded rubber layer which may increase lug strength and durability, enhance lug grip, and/or protect internally enclosed lug structures. Another advantage is that modular implementation of the lugs may allow for easy maintenance, repair, or replacement of said lugs as needed, rather than replacement of the whole wheel. Another advantage is that the disclosed wheel may utilize a disk having scalloped portions, wherein said scalloped portions allow for easier manipulation of lugs and provide enhanced load bearing capabilities to said wheel.

In another aspect, a lug for use in a wheel is a provided, the lug comprising: a center rib; a first leg and a second leg, each leg extending from the center rib laterally and opposite of each other; and a lug plate adapted to connect the first leg to the center rib Again, an advantage is that an attached wheel will have enhanced traction due to the lug having a protruding lug plate to better grip the driving surface. Another advantage is that the lug plates may provide structural support to the lugs, thus increasing their strength while providing enhanced traction between the lug and a driving surface. Another advantage is that the lug may be provided with an overmolded rubber layer which may increase lug strength and durability, enhance lug grip, and/or protect internally enclosed lug structures.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 7A illustrates a perspective view of the lug, according to an embodiment.

FIG. 7B illustrates a perspective view of the lug, according to an embodiment.

FIG. 11A illustrates a perspective view of a lug, according to an embodiment.

FIG. 11B illustrates a cross-sectional side view of a lug, according to an embodiment.

DETAILED DESCRIPTION

Figure 1A:
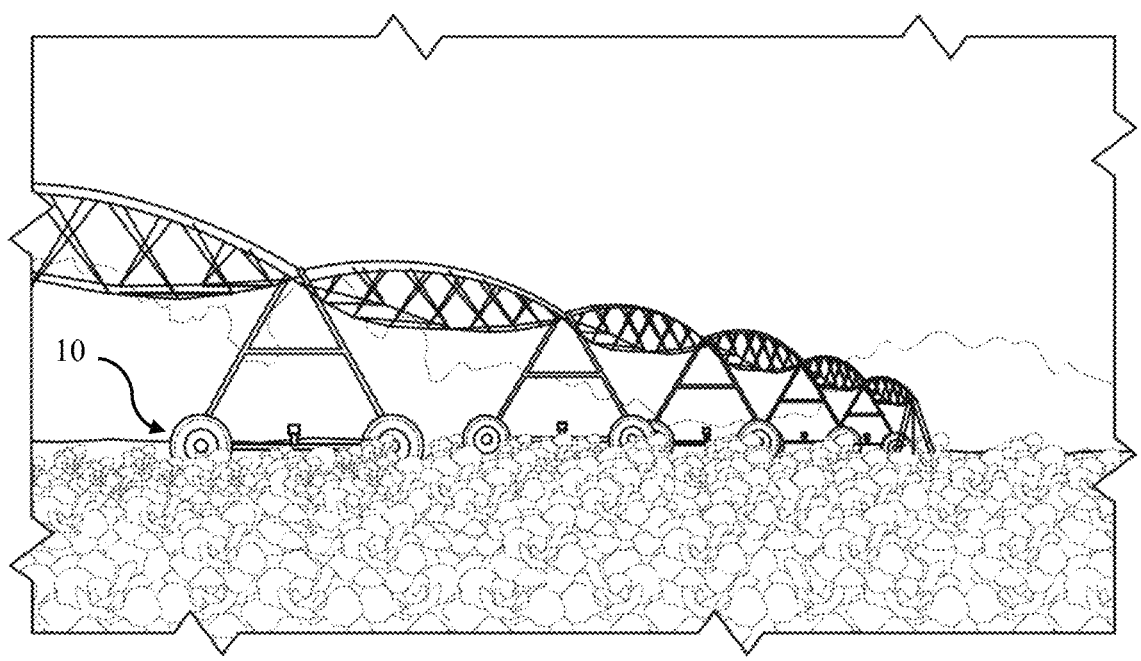
FIG. 1A illustrates a center pivot irrigation system as used in farming, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

In the foregoing description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
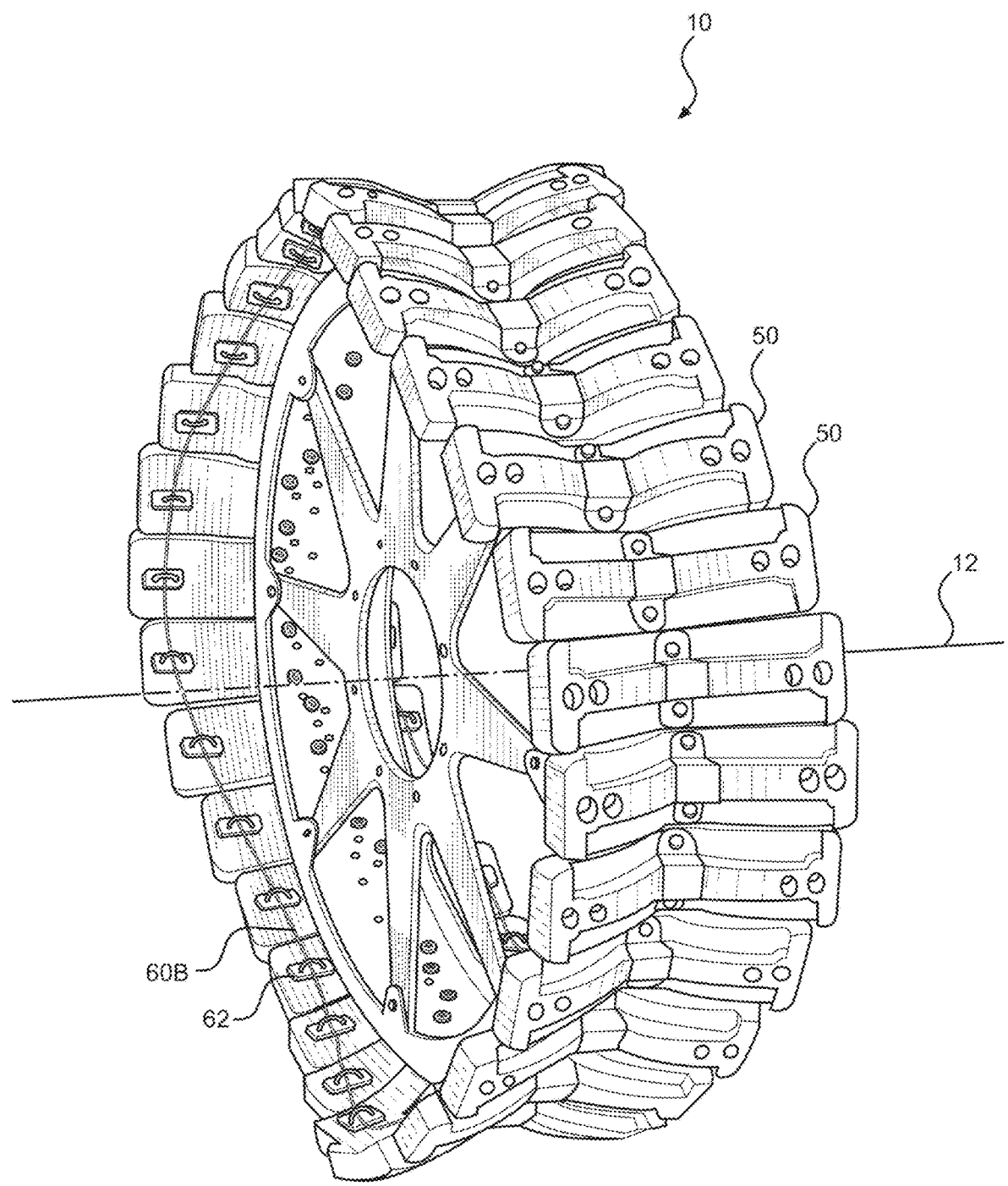
FIG. 1B illustrates a perspective view of an embodiment of a wheel used in center pivot irrigation systems, according to an aspect.
Figure 2:
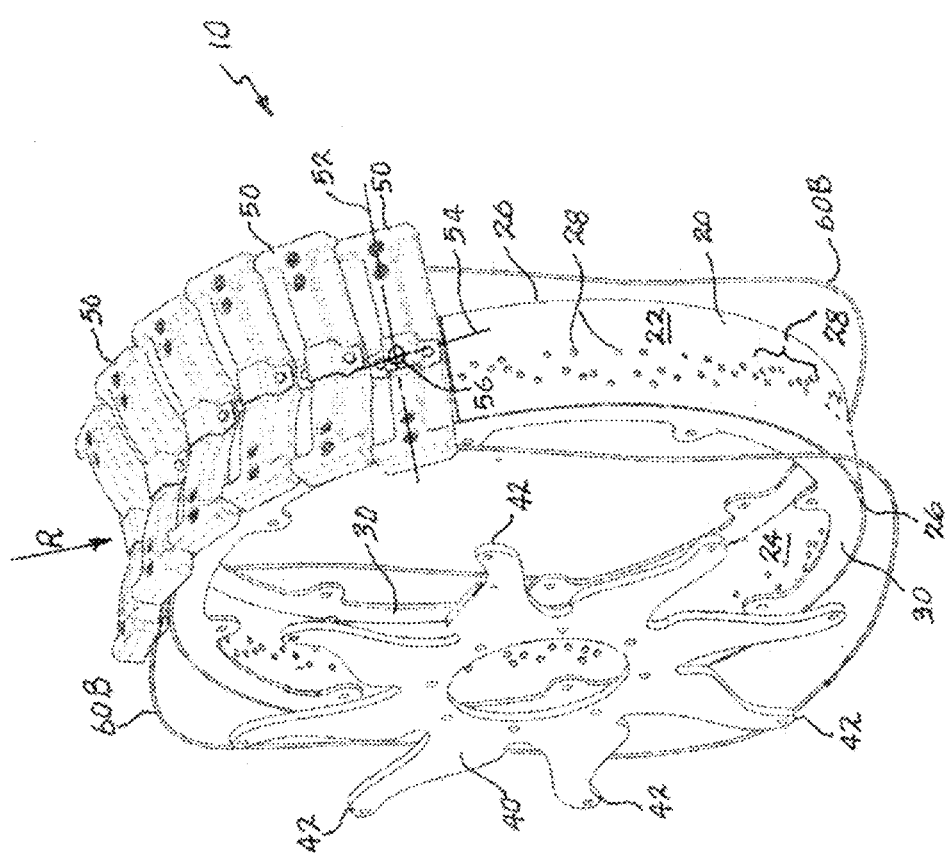
FIG. 2 illustrates a further perspective view of the farm irrigation wheel, according to an aspect.

FIG. 1A illustrates a typical center pivot irrigation operation in progress. As described in detail herein, a utility farm wheel ("wheel," "farm wheel") 10 as used in this type of irrigation as best illustrated in FIG. 1B is provided. As shown in FIG. 2, the wheel 10 may be an assembly of individual parts that may be joined together in various ways. In an embodiment, the individual parts may include a ring 20, a pair of rim flanges 30, one or two disk portions 40, and a plurality of identical lugs 50. In this embodiment, shown in FIG. 1B a tensioning device 60B typically either a tension band (not shown) or a tension cable may also be used and may improve the alignment of the lugs 50. The parts may be made of metal or other materials providing suitable tensile strength, elasticity, flexibility and other characteristics as will be known by those of skill in the mechanical arts and as described herein.

Figure 3:
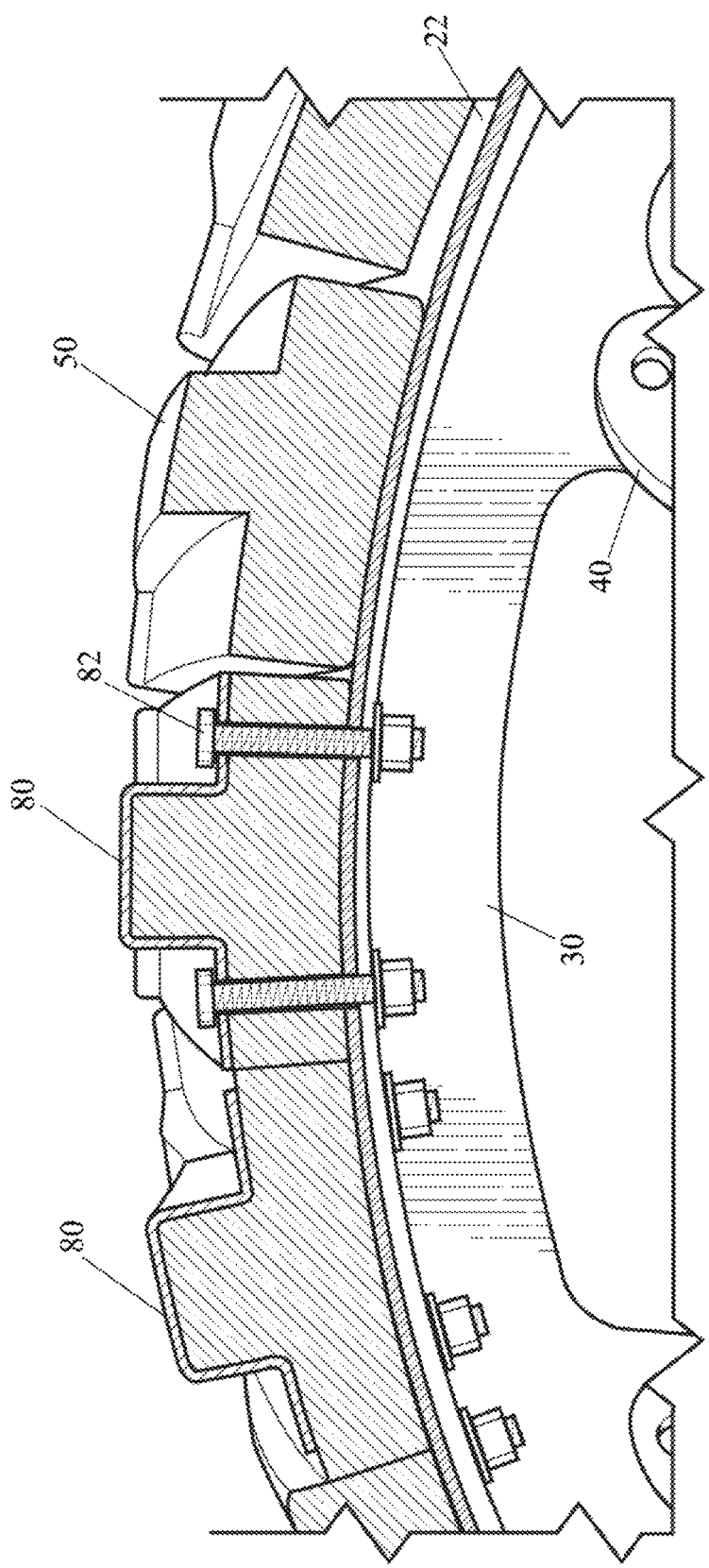
FIG. 3 illustrates a partial vertical section view of the farm irrigation wheel, according to an aspect.

Additionally, the ring 20 may be manufactured by laser cutting a flat strip of metal and then rolling it to form a cylinder with ends overlapped and welded together. Therefore, the ring 20 may have an outer surface 22 an inner surface 24 and a pair of opposing edges 26. The ring 20 may have a pattern of through holes 28 in its surface as shown in FIG. 2. The rim flanges 30 may be secured to the edges 26 of ring 20 by welding, for instance, and the ends of legs 42 of disk portion 40 may be secured to rim flange 30 using common hardware. The lugs 50 may be bolted onto the outer surface 22 as shown in FIG. 3. Each lug 50 may be mounted on ring 20 by a bracket 80, possibly of shaped sheet metal, and held in place by bolts 82 as shown. The holes 28 may be arranged in different patterns permitting lugs 50 to be arranged in alternative configurations as will be described. The wheel 10 has a central rotational axis ("wheel rotational axis", "rotational axis") 12. As shown in FIG. 2, the lugs 50, as sighted radially toward wheel 10 (see arrow R), are rectangular in shape having a long axis 52 positioned centrally between its opposing long sides, and a short axis 54 positioned centrally between its opposing short sides. The point where long axis 52 and short axis 54 cross is a central point 56 of lug 50.

Figure 4:
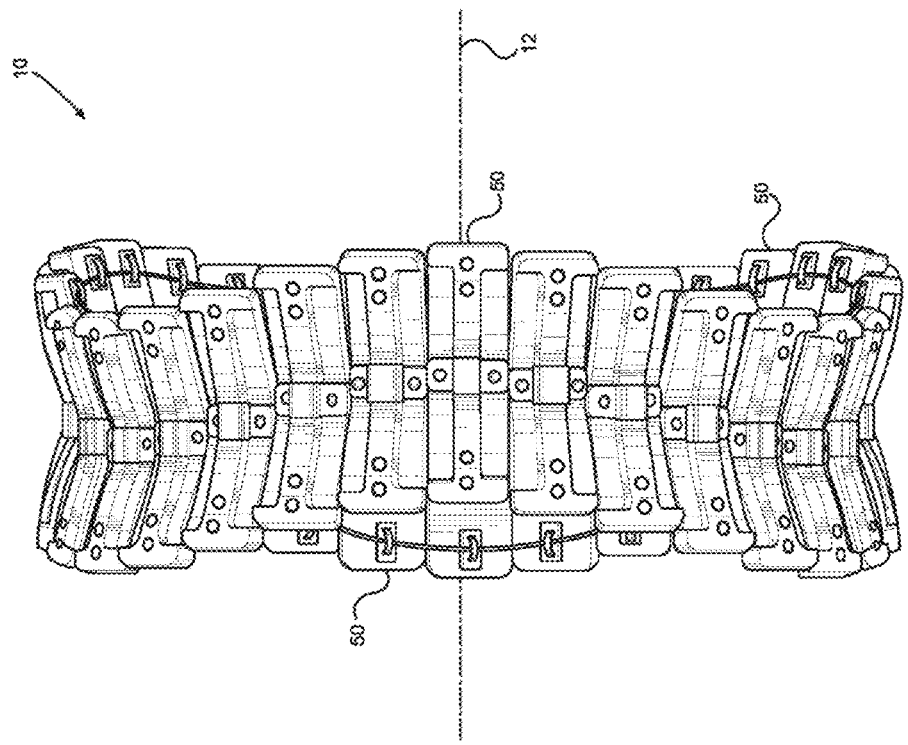
FIG. 4 illustrates a front elevation view of the farm irrigation wheel, according to an aspect.

The lugs 50 may be fixed to the surface 22 such that long axis 52 are parallel to wheel rotational axis 12, see FIG. 1B. The lugs 50 may be placed in side-by-side positions around ring 20 with their short axis 54 aligned colinearly and centered between opposing edges 26, that is, centered on ring 20; this is one mounting option. However, the lugs 50 may alternately be positioned on ring 20 in laterally offset positions (see FIG. 5) with respect to each other to form a continuously and possibly smoothly varying locus of the central points 56 as shown in FIG. 4. In an embodiment, the smoothly varying locus of central points 56, may execute a sinusoidal curve having a sinusoidal amplitude and a sinusoidal period. The sinusoidal amplitude may be varied by changing the magnitude of the lateral incremental positions of the centers 56 of one lug 50 relative to the next. On the other hand, the distance about the circumference of wheel 10 of a single sinusoidal cycle may be varied by changing the circumferential width of lugs 50. The positions of the lugs 50 may be determined by the position of holes 28 in ring 20. Those of skill in the art will be able to determine the locations of holes 28 to produce a desired sinusoidal or alternate arrangement of the lugs 50.

Figure 5:
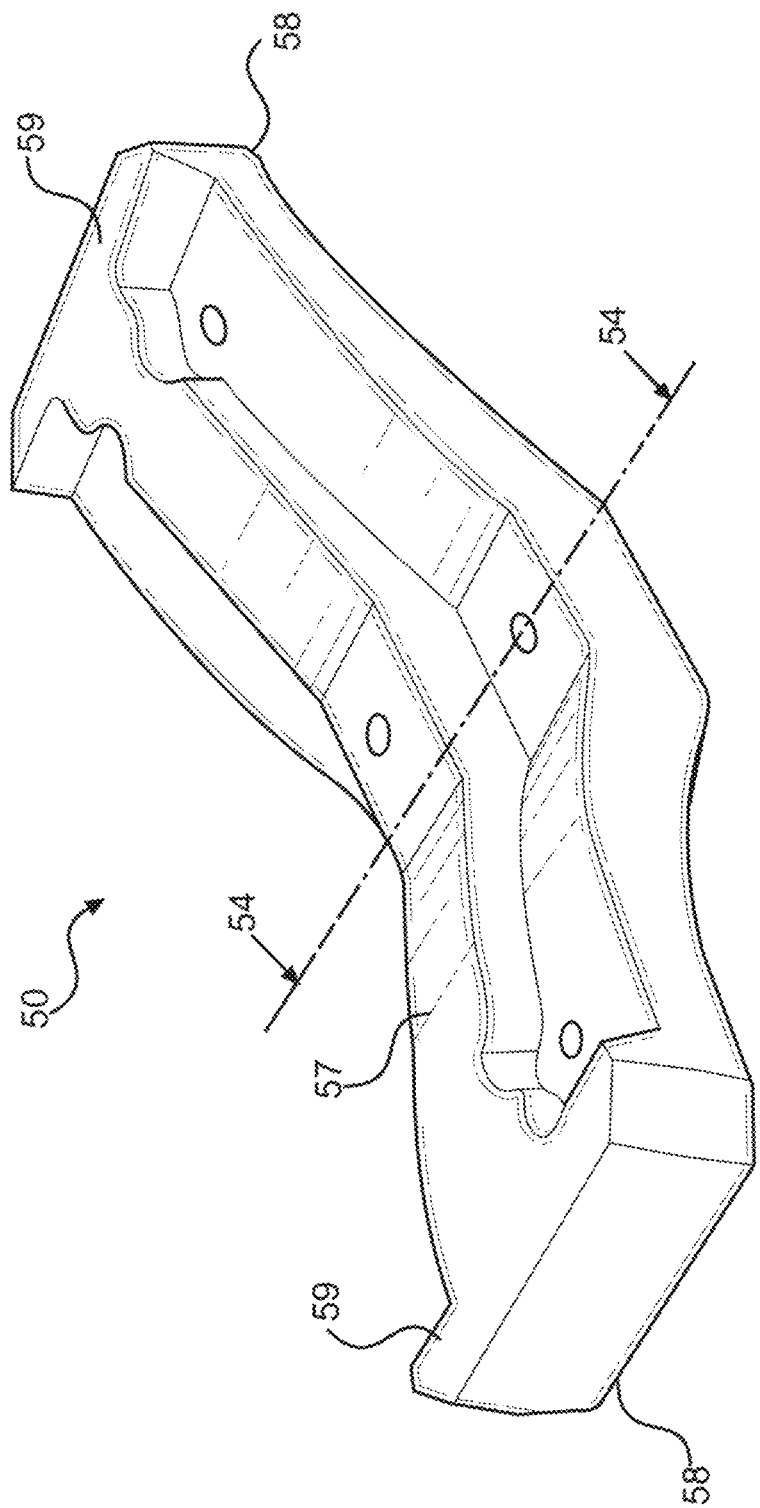
FIG. 5 illustrates a perspective view of a lug of the farm irrigation wheel, according to an aspect.

As shown in FIG. 5, each lug 50 may have an outwardly directed roughly V-shape (as sighted along the circumference of wheel 10). The two opposing legs 58 of said V-shape diverges from surface 22 on either side of axis 54 where the lug 50 is fastened to ring 20. During rotation of wheel 10 each lug 50 contacts a surface upon which wheel 10 rides. Such contact is initially made by the extreme lateral ends of lug 50 along axis 52. Upon further wheel rotation greater weight is brought to bear on the legs causing the divergent angle to lessen and cause greater strain within lugs 50. A rib 57 extends in the direction of axis 52 across the outfacing portion of leg 50 and provides a means for wheel 10 to develop greater traction especially in relatively soft farm soil. At the ends of the legs of lug 50 are ribs 59 positioned orthogonal to rib 57 in order to limit sideways slippage of wheel 10.

The tensioning device 60B may be made of high-strength Nylon® cable or stainless-steel band stock and may be fixed to lugs 50 on both left and right lateral underside surfaces of the legs by cleats 62 as shown in FIG. 1. The tensioning device 60B may allow a gap between adjacent lugs 50 to remain consistent and also may allow lugs 50 to be pre-tensioned for a desired stiffness, that is, drawing the divergence angle of the legs of lugs 50 away from surface 22 to a greater or lesser degree. This also enables adjacent lugs 50 to share and transfer loads between them which is important for sharing and distributing shock loads when obstacles such as rocks are encountered.

Figure 6:
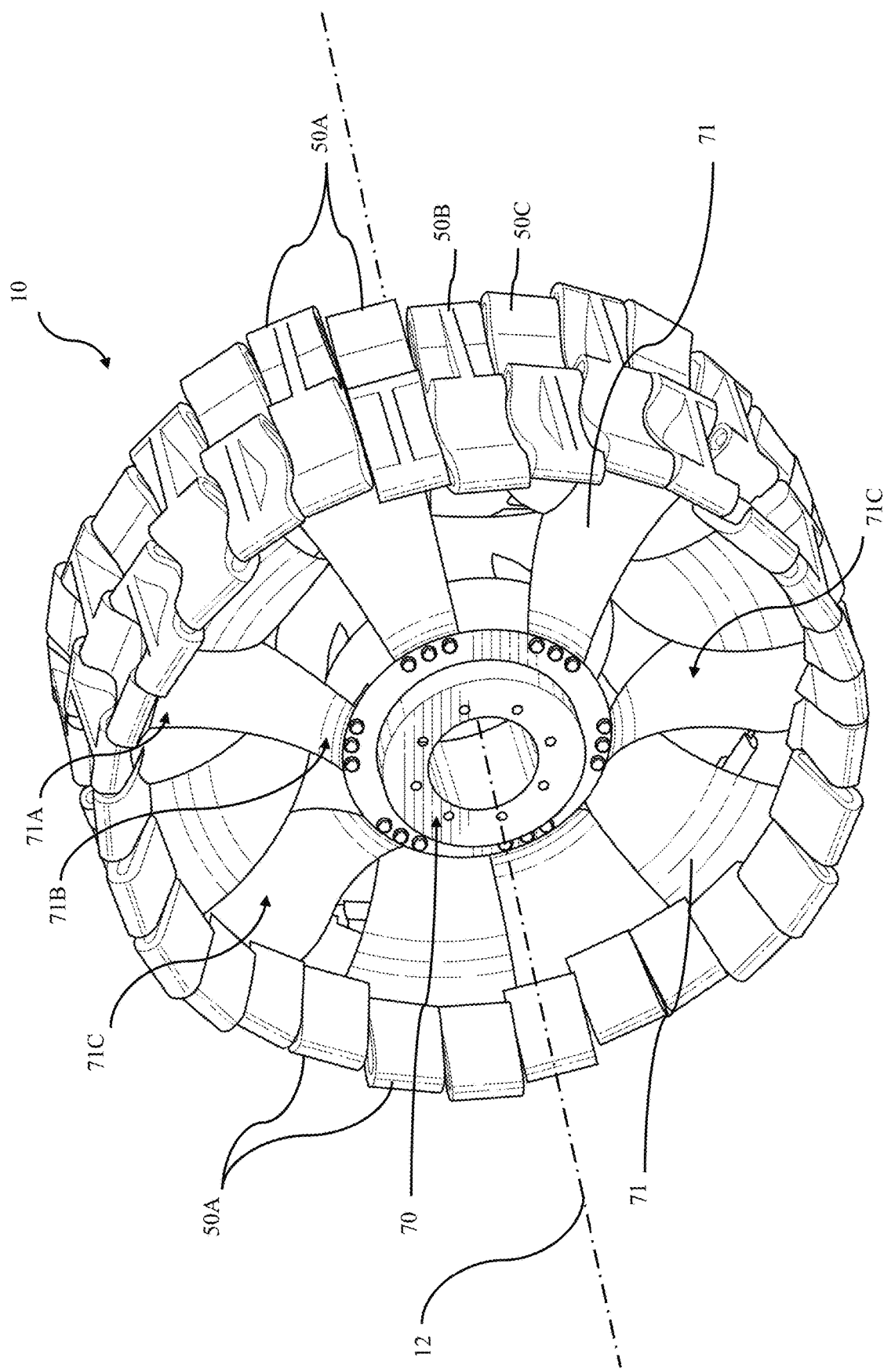
FIG. 6 illustrates a perspective view of the farm irrigation wheel, according to an embodiment.

FIG. 6 illustrates a perspective view of the farm irrigation wheel 10, according to an aspect. In another embodiment, the individual parts may include a ring 20 (shown in FIG. 9), a hub 70, a plurality of spokes 71, and a plurality of identical lugs 50A. As shown, the farm irrigation wheel 10 may have a hub 70, spokes ("fins") 71, lugs 50A, and a ring 20. As described herein, the disk portion 40, shown in FIG.2, may be broken up into hub 70 and spokes ("fins") 71 components. Furthermore, having the hub 70 and the spokes 71 as separates parts may allow for better durability. Additionally, having each spoke 71 as a separate component may allow for easier maintenance. For example, if a spoke 71 were to be damaged, the single spoke 71 may be replaced without the need to replace the entire wheel 10. Again, instead of legs 58 on a disk 40, the farm irrigation wheel 10 may have a hub 70 with spokes 71, which may provide additional strength to the wheel and more traction.

As shown in FIG. 6, the spokes 71 may be concaved and attach at alternating locations. The spokes 71 of the wheel 10 can provide traction and help the wheel not slip if it is moving through an existing rut. Typically, wheel hubs and spokes only have a purpose to handle loads, while, as described herein, the spokes 71 may provide additional traction. The spokes 71 may aid in traction, if necessary, by cutting into the ground surface (i.e., soil or dirt). For example, if the wheel 10 begins to sink below ground level (i.e., in a 'rut' or 'trench') the wheel 10 may continue to function due to the spokes 71.

The spokes ("fins") 71 may have a concave surface 71C to increase their strength. This allows for an increase in strength while keeping the metal very thin, which may keep costs down due to the spoke's 71 thin structure. Additionally, the spokes 71 allow the center of gravity of the wheel to be at the center of the hub at times, allowing the wheel 10 to be well-balanced, which will be described in more detail herein.

The wheel 10 is 'compliant' and may bend and flex to absorb heavy loads. Furthermore, both the spokes 71 and the lugs 50A may be compliant to allow for the appropriate flex in the wheel 10 to handle larger loads. Additionally, the outer surface of the wheel may help to reduce the formation of ruts and maintenance of traction in soft earth.

The lugs 50A may also have lug plates that are horizontal and raised higher than the lugs 50 shown in FIG. 5, the lugs 50A provide additional traction to the wheel 10. Furthermore, the spokes 71 may provide traction for the wheel 10 if the wheel does sink in the soil. The sine wave of the ring 20 may further help with traction because the sine wave pushing the soil towards the center to provide more traction for the wheel 10. The geometric shape of the spokes 71 may act as, for example, a person swimming, the spokes 71 help grip soil to dig out of a hole similar to arms while swimming. Furthermore, the spokes 71 may act as paddles to help dig the wheel 10 out of any soil or rut. Additionally, if the wheel 10 sinks in soft soil, the spokes 71 act similarly to the arms and hands of a swimmer to advance and move forward in the alternating arm or paddle like motion.

For example, a pair of the spokes 71 cut into the ground evenly and push the wheel upwards when necessary (i.e., in a rut). Current wheels do not usually have a center traction element that the spokes 71 provide. Moreover, the crossing and curvature of each spoke 71 may contribute to the traction, only when the wheel 10 has sunk into soft soil.

As shown, each spoke 71 may have a narrow end 71B and a wider end 71A, and each wider end 71A may be mounted to a sinusoidal peak 78 on the ring 20. The changing width of each spoke 71 may eliminate, or reduce, the resonance force. Each spoke 71 is configured to attach to the hub 70 by said spoke's narrow end 71B to help reduce the resonance force reaching the hub 70 as the vibrations move through the wheel 10. Reducing the resonance force reaching the hub 70 may help avoid deterioration of the wheel 10.

Additionally, the spokes 71 may act as shocks and absorb vibration, stresses and loads of the wheel, which increases the strength of the wheel 10 by adding a compliant aspect to the design. The concavity of the spokes 71 may increases the strength geometrically speaking, which will be discussed in more detail when referring to FIG. 10C. The concavity of the spoke 71 may be manufactured through metal forming. In another example, the concavity of the spoke 71 may be created during installation of the spokes 71 into the ring 20.

The wheel may be made of a low-grade carbon steel for cost purposes, but a preferred material may be spring steel. Spring steel may be preferred to control and increase the elasticity and compliance of the wheel 10 and lugs 50A. The geometry of the spokes 71 may allow the spokes 71 to flex, and the spokes 71 may interfere with each other once the spokes 71 bend to a certain point. For example, under a large load, immediately adjacent spokes 71 may support a center flexing spoke 71. The two adject spokes 71 may provide the resistance for the spoke 71 between them. While in a resting state, with no load applied the spokes 71 may not be touching. It should be noted the space between the spokes 71 is also narrowing as the spokes 71 move towards the hub 70 and are nearly touching before a load is applied.

Figure 7C:
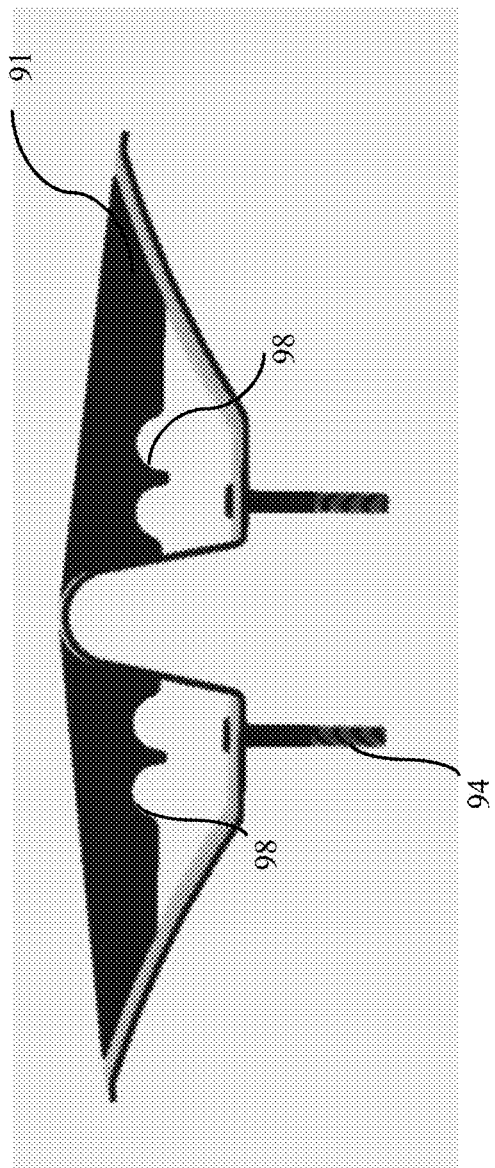
FIGS. 7C-7F illustrate a side view of the lug, according to an embodiment.
Figure 7D:
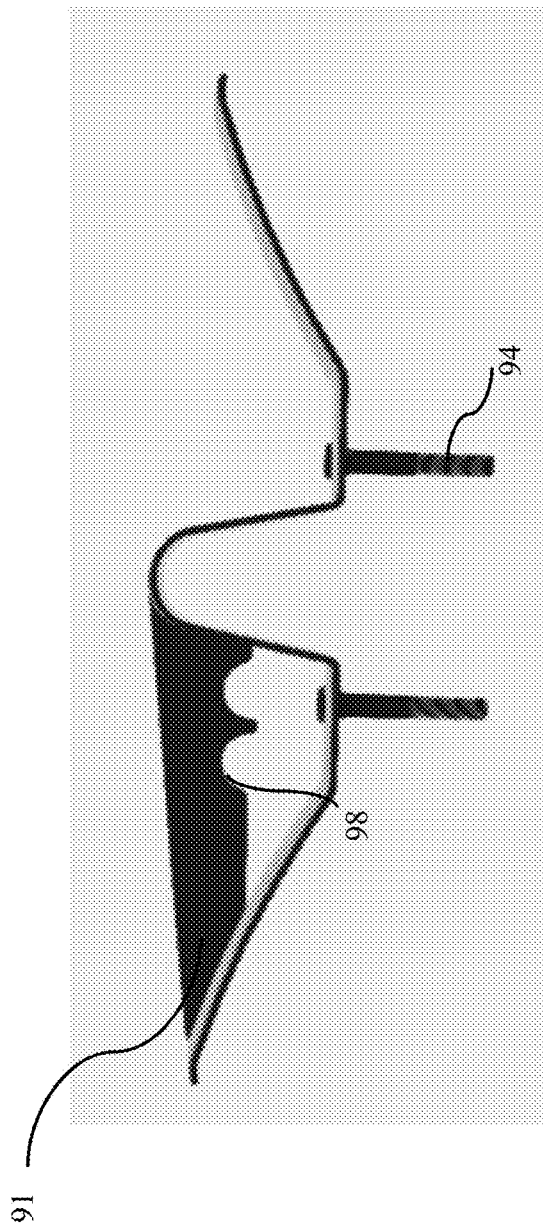

FIG. 7A illustrates a perspective view of the lug, according to an aspect. FIG. 7B illustrates an interior view of the lug, according to an aspect. Additionally, the lug shown in FIGS. 7A and 7B, the lugs 50A may have metal built into the lug 50A interior. Moreover, a liquid rubber may be overmolded onto the metal for additional strength and durability. The metal interior may allow the lug 50A to flex and twist, which is necessary in the typical abusive farming environment. For example, the lugs 50A may be made of spring steel, and may have the additional rubber overmold. Each lug 50A may be mounted on ring 20 by a bolt. The holes 28, shown in FIG. 9, may be arranged in different patterns permitting lugs 50A to be arranged in alternative configurations as will be described. The lugs 50A may have a flat portion with bolt holes 93 to allow the lugs 50A to easily secure to the ring 20.

A lug plate 91 extends in the direction of center rib 92 across the outfacing portion of leg 50 and provides a means for wheel 10 to develop greater traction especially in relatively soft farm soil. At the ends of the legs of lug 50A are lug plate 91 positioned orthogonal to center rib 92 in order to limit sideways slippage of wheel 10. It should be understood that the lug 50A could be built in other ways such as having, for example, a metal interior frame with an overmolded rubber coat.

The lugs 50A may have a lug plate 91 to further help with traction while the wheel 10 is in use. The lug plates 91 and the center peak ("center rib") 92 on the lugs 50A may allow the wheel 10 to have proper traction on the softer farming soils. Additionally, the orientation of the lugs 50A may further help with traction over the farming landscapes. One or more bolt holes 93 may be provided on each lug to allow bolts to be used to secure the lug 50A to the ring 20. As shown, each of the plurality of lugs 50A may have opposing legs 95 forming a W-shape with the center rib 92, wherein the alignment of the outermost point of each center rib 92 may form a sinusoidal pattern that is coaxial with the rotational axis 12. Moreover, the lug plate 91 may connect a lug leg 95 to lug center rib 92, while also being connected to the flat portion 97 of the leg 95. As described herein, the lug plate 91 may provide additional structural support, while also providing additional traction for the wheel 10. As another example, the lug 50A may have a lug plate 91 on both sides of the center rib to provide additional traction and support, shown in FIGS. 7C, 7F, and 7G.

Additionally, the lugs 50A may be positioned in an alternating pattern, as shown in FIG. 6. The lugs 50A may be oriented to have the lug plate 91 on one side while the next adjacent lug 50A may have the lug plate 91 on the opposing side. For example, as shown in FIG. 6 lug 50B and lug 50C depict the alternating pattern of the lugs 50A orientation along the ring 20. Each of the plurality of spokes 71 may be concaved and arranged in an alternating pattern. The alternating pattern may be, as shown, the top end 71A of each of the plurality of spokes 71 being attached alternately to the first outer edge 20A or the second outer edge 20B of the circular ring 20 and the bottom end 71B of each of the plurality of spokes is attached alternately to the first side 75 or the second side 74 of the hub.

Figure 7E:
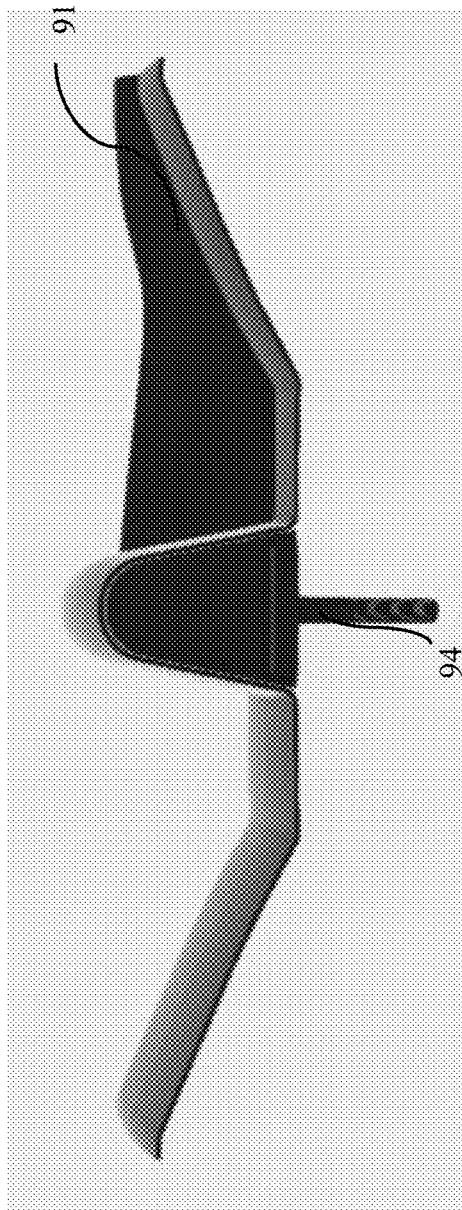
Figure 7F:
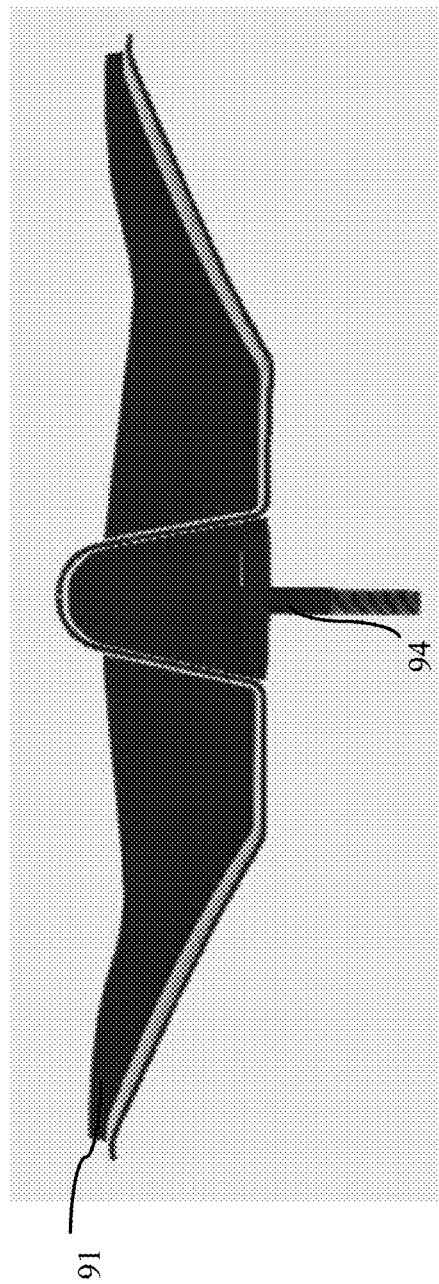

FIGS. 7C-7F illustrate a side view of the lug, according to an embodiment. As another example, the lug 50A may have a lug plate 91 on both sides of the lug, shown in FIGS. 7C and 7F. Furthermore, as shown the lug plate 91 may not attach to the flat portion 97. Additionally, the lug plate 91 may have cutouts 98, for example, to lower costs but maintain the structural integrity of the lug 50A. Additionally, these cutouts 98 disposed within each lug plate 91 may allow mud and debris to escape and not get stuck in the lug 50A. As shown in FIGS. 7E and 7F, the lugs 50A may have a solid structure disposed within the center rib 92, such that a solid center rib 92 is present. As an example, the lug 50A may have a solid center rib 92 to provide additional strength. Also, as shown, the bolt holes 93 and bolts 94 may be in the center of the lug 50A instead of positioned in the flat portions.

Figure 7G:
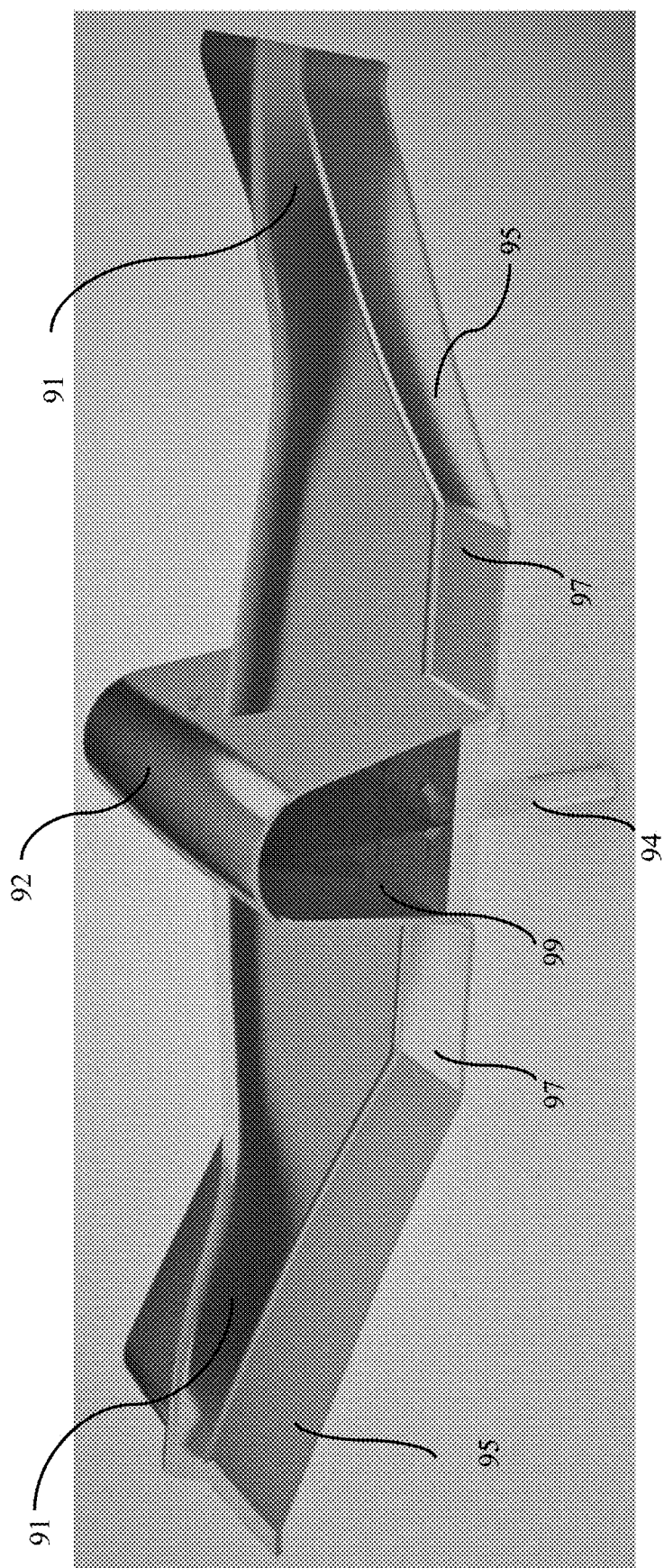
FIG. 7G illustrates a perspective view of the lug, according to an embodiment.

FIG. 7G illustrates a perspective view of the lug, according to an embodiment. As shown, lugs 50A may have a solid center rib 92. For example, the lug 50A may be made of a spring steel, while the interior 99 of the center rib 92 may be a rubber material. Having spring steel as the exterior of the lug 50A and as the material which is in contact with the ground allows the lugs 50A and wheel 10 to be more durable. Additionally, as shown in FIG. 7G, the lug plate 91 may have a triangular cross section, where the widest portion of the lug plate 91 is where the lug plate meets the flat portions 97. The triangular cross section of the lug 50A, as shown in FIG. 7G, may allow the lug plate 91 to be stronger. The wide bottom of the lug plate 91 may help the lug plate from breaking off during use. As described herein, the lug plate 91 allows for improved traction between the wheel 10 and the ground. Furthermore, the highest point of the lug 50A may be the solid center rib 92, which would help when the wheel 10 may transverse hard surfaces. For example, this is due to the solid center rib 92 having a hard exterior surface while having the additional interior rubber support. Moreover, the solid center rib 92 being the highest point of the lug 50A may allow only the top surface of the center rib 92 to touch the ground while on a harder surface.

Figure 7H:
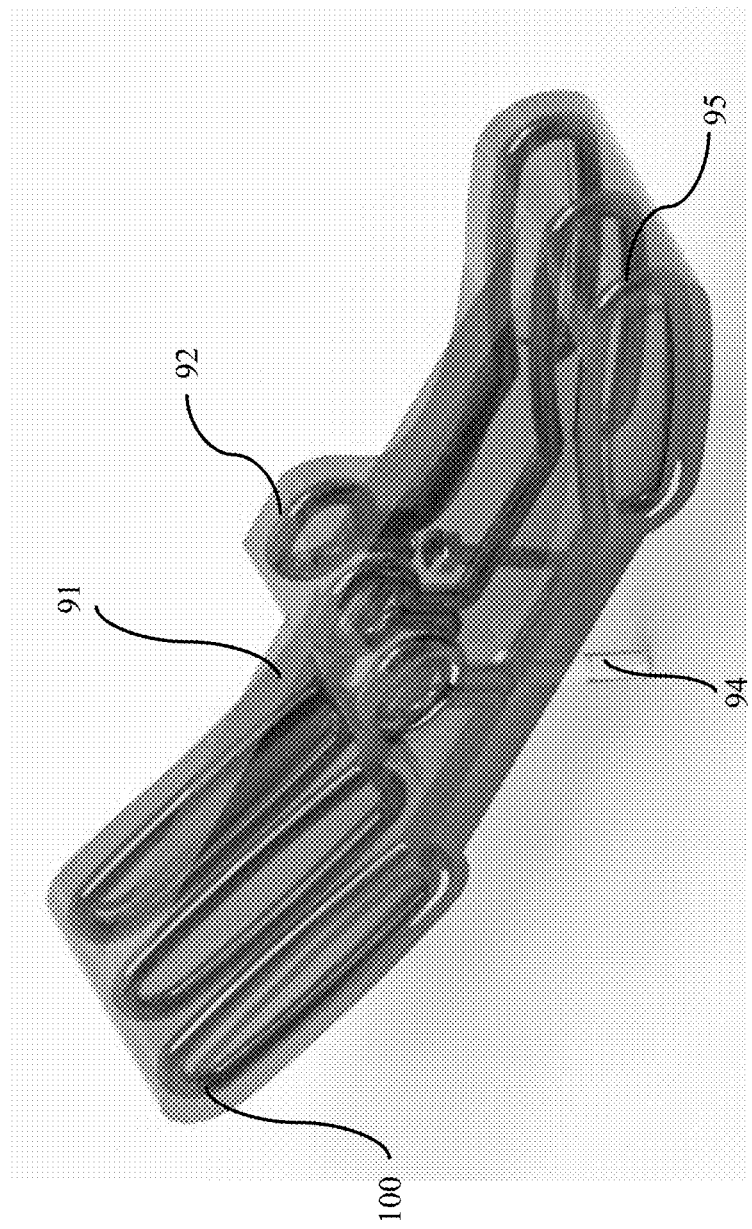
FIG. 7H illustrates a perspective semitransparent view of the lug, according to an embodiment.

FIG. 7H illustrates a perspective semitransparent view of the lug 50A, according to an embodiment. As shown, the lug 50A may have a metal interior frame 100. The metal interior frame 100 may include wires made of spring steel and have an overmolded rubber layer for maximal compliancy. Also, as shown, the bolt holes 93 and bolts 94 may be in the center of the lug 50A instead of positioned in the flat portions. Again, the lug plates 91 allows for improved traction for the wheel 10. For example, as shown, the metal interior frame 100 may be a plurality of wire components to create the lug shape. Furthermore, the highest point of the lug 50A may be the center rib 92, which would help when the wheel 10 may transverse hard surfaces, for example, when on a road prior to the soft farming soil.

Figure 8:
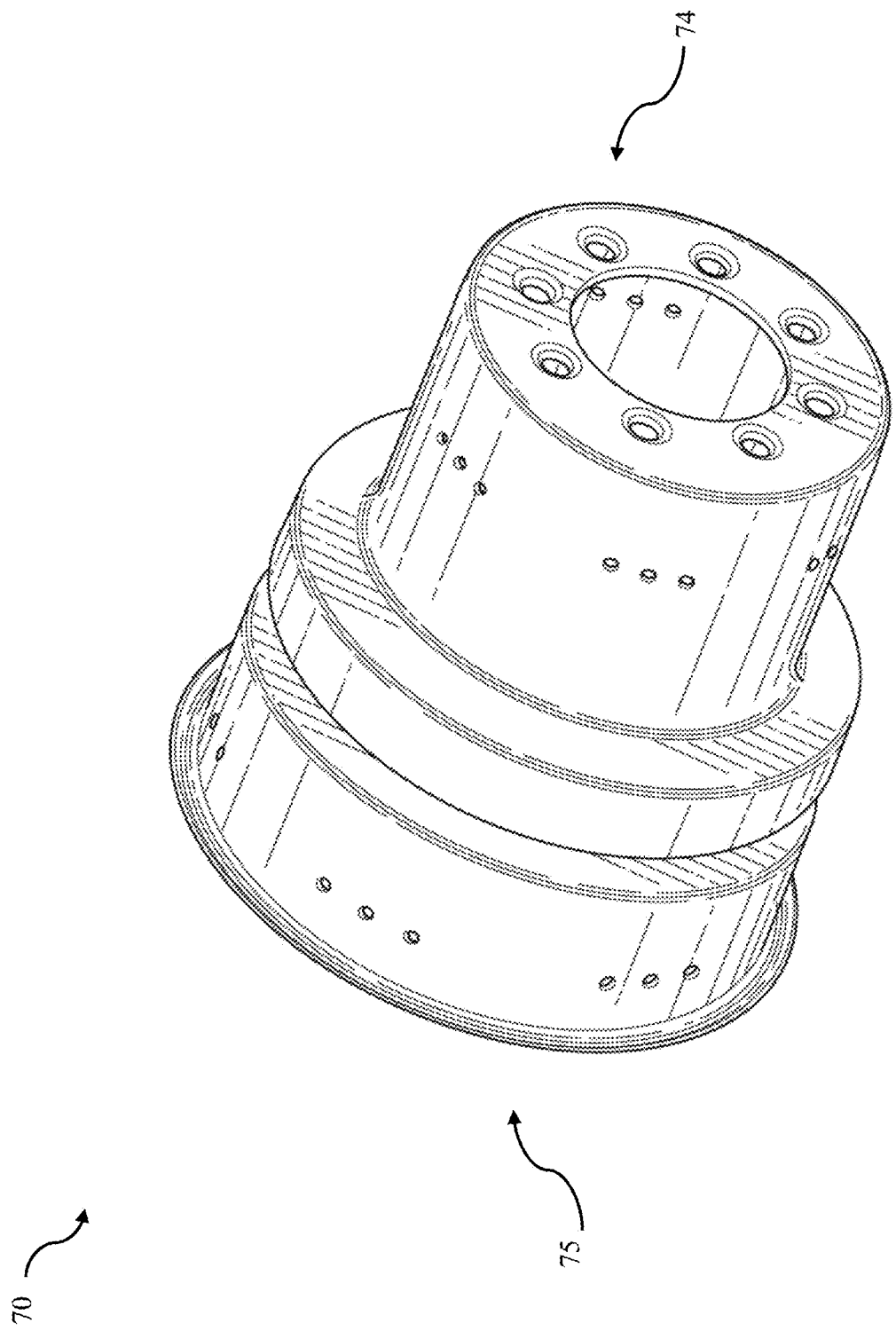
FIG. 8 illustrates a perspective view of the farm irrigation wheel hub, according to an embodiment.

FIG. 8 illustrates a perspective view of the farm irrigation wheel hub ("hub")70, according to an embodiment. As shown, the hub 70 has a narrow end ("second side") 74 and a wider end ("first side") 75. The hub 70 may allow the farm irrigation wheel 10 to be attached to a center pivot irrigation system, as shown in FIG. 1A. The hub 70 also allows the alternating pattern of the spokes 71 to be securely attached. As described herein, the spokes 71 allow the wheel 10 to have traction even if the wheel 10 becomes somewhat submerged in the landscape.

Figure 9:
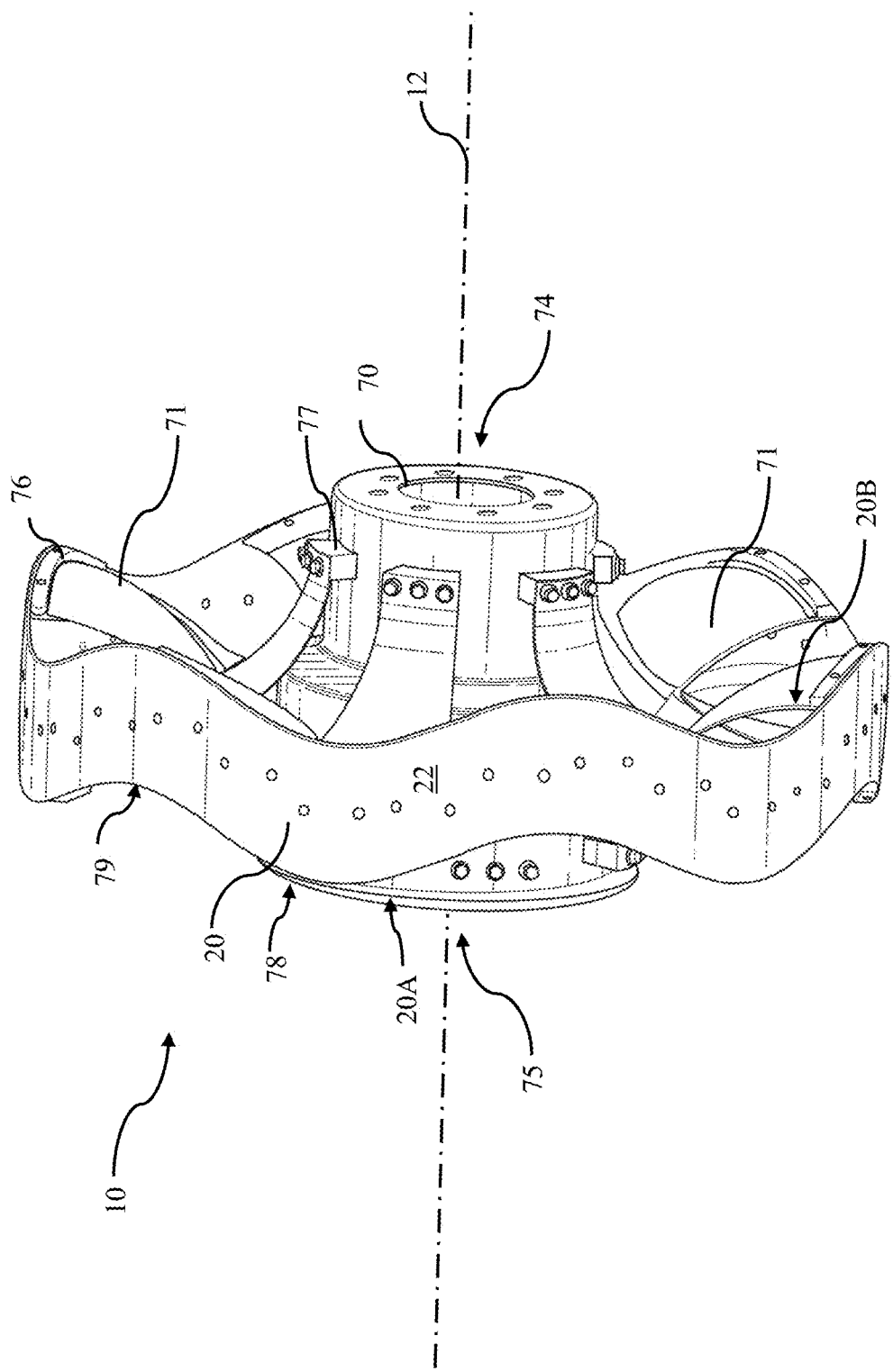
FIG. 9 illustrates a perspective view of the farm irrigation wheel without the lugs attached, according to an embodiment.

FIG. 9 illustrates a perspective view of the farm irrigation wheel 10 without the lugs 50 attached, according to an aspect. The plurality of lugs (not shown) may be mounted in side-by-side positions to form a circular ring wherein each of the lugs has laterally extending legs forming a W-shape. The alignment of the outermost point of each center rib 92 may form a sinusoidal pattern that is coaxial with the rotational axis 12. This alignment of the lugs 50 may be the result of the through holes 28 disposed on the outer surface 22 of the ring 20 also being arranged in a sinusoidal pattern that is coaxial with the rotational axis 12 The lugs may have an outfacing rib aligned with the rotational axis 12 and a further outfacing rib orthogonal to the rotational axis. The lugs may be mutually offset around the circular ring in a sinusoidal pattern to further help with traction and wear and tear.

The ring 20 may have a pattern of through holes 28 in its surface as shown in FIG. 2. The spokes 70 may be secured to ring 20 using support pieces 76, 77 and common hardware (e.g., bolts). Furthermore, as shown in FIG. 9, the spokes 70 may be attached to both the hub 70 and ring 20 by a combination of bolts and support pieces 76, 77. For example, as shown, the spoke 70 may rest on a support piece 77 and have a bolt secure the spoke 71 to the hub 70 by penetrating the holes in all three components. Additionally, the support pieces 76 and 77 may follow the curvature of both the hub 70 and the ring 20 to be flush against each surface, respectively, allowing for more secure connection. As described herein, the lugs 50A may have a flat portion with bolt holes 93 to allow the lugs 50A to easily secure to the ring 20. Additionally, configuring the spokes 71 to be removable allows for a decrease of fatigue on the wheel. Moreover, the modular aspect of the wheel 10 may reduce shipping costs, while also making maintenance easier.

Furthermore, each spoke may attach to the peak 78 of the sine wave of the ring 20. It should be noted that when the spokes connect to the sinusoidal ring it attaches to the peak 78 as opposed to the valley 79 of the respective sinusoidal edge of the ring 20. It should be noted the alternating mounting of the spokes 71 contributes to the improved traction in soil while preserving a relatively light weight structure of the wheel. For example, the spoke 71 may be mounted with the top 71A on the first side 20A of the ring 20 and the bottom 71B attached to the second side 74 of the hub 70. Additionally, for example, the adjacent the spoke 71 may be mounted with the top 71A on the second side 20B of the ring 20 and the bottom 71B attached to the first side 75 of the hub 70. This alternating pattern may continue for the entirety of the mounting of the spokes 71. Moreover, the spokes 71 may be mounted with their concave surface facing outward, as shown in FIG. 9. The alternating spoke orientation may allow for the weight to always be distributed evenly and allow the center of gravity to be perfectly balanced. It should be noted the spokes 71 being built from a steel sheet provides the advantages of the light weight and lower cost of manufacturing the wheel 10. In another example, the wheel 10 may be made of 1020 steel.

Additionally, each spoke 71 attaching to the peak 78 of the sinusoidal edge of the ring 20 may allow the wheel 10 to stay balanced even during hard or sharp turns. For example, for hard turns the peak 78 may support the weight more so and thus the spokes 71 and hub 70 may compensate for the force. Moreover, because each spoke 71 crosses the center and attaches to the peak 78 the weight may be distributed evenly, which allows the wheel 10 to be more balanced. For example, while the wheel 10 is moving, the sine shape of the ring 20 shifting from left to right puts the stress on the spoke 71 because it attaches to peak 78.

Figure 10A:
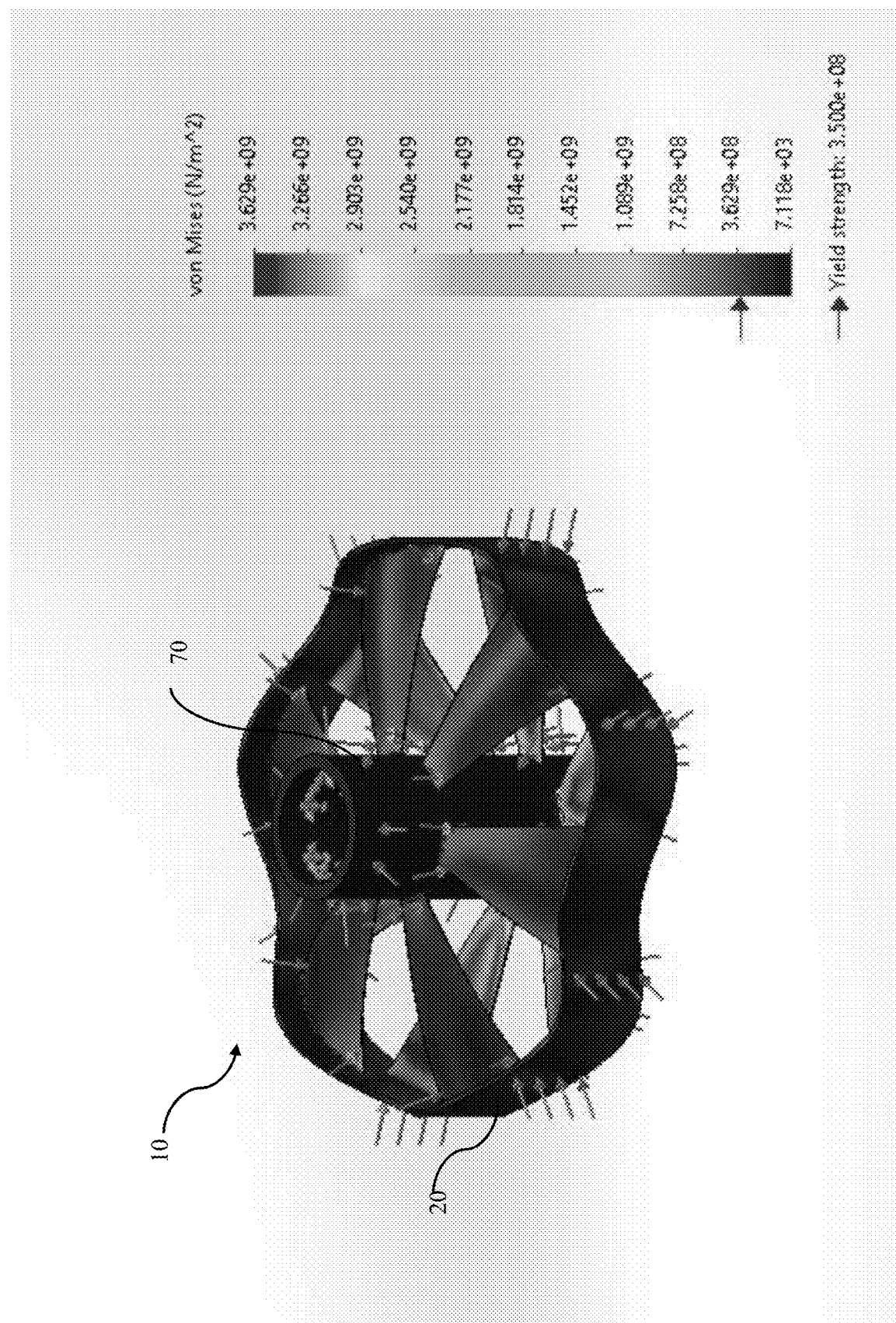
FIG. 10A illustrates a perspective view of the farm irrigation wheel during a von Mises stress simulation, according to an embodiment.
Figure 10B:
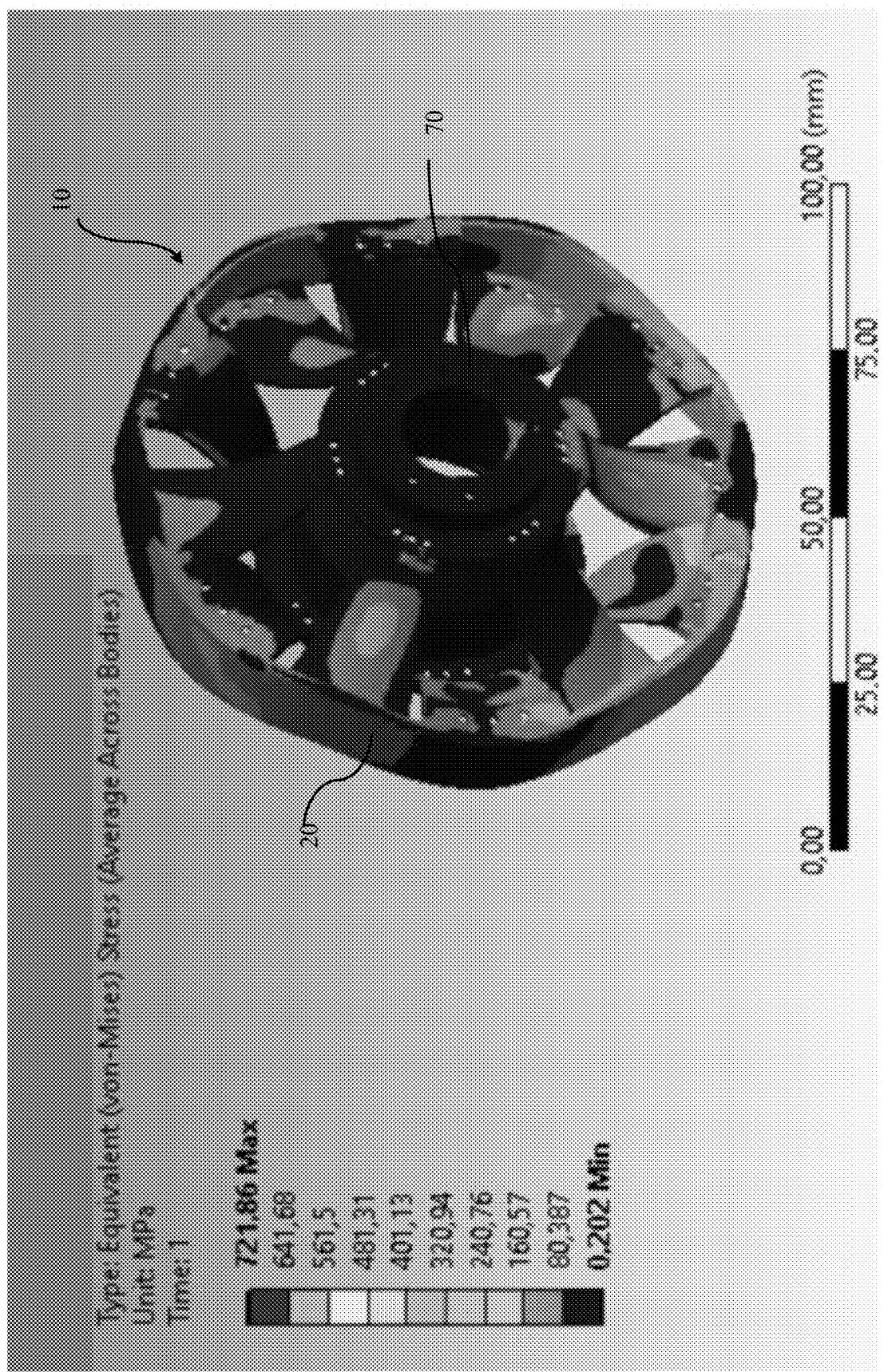
FIG. 10B illustrates a perspective view of the farm irrigation wheel during a von Mises stress simulation, according to an embodiment.

FIG. 10A and FIG. 10B illustrates a perspective view of the farm irrigation wheel during a von Mises stress simulation, according to an embodiment. For example, in a simulation test, a 3D of the wheel 10 without the lugs 50A was evaluated for it is strength under varying conditions. During the von Mises Stress test simulation, the wheel 10 without the lugs 50A had a yield strength of 3.500e+08 N/m^2. Thus, the wheel 10 can withstand a typical load and not deform in any way. Additionally, this farm irrigation wheel 10 has a better yield strength because of the alternating spokes 71, while still being durable and providing traction. As testing showed, each wheel may withstand over 20,000 lbs. of force before breaking with a max load is 6,000 lbs. per wheel (12,000 lbs. per tower). Furthermore, as shown in FIG. 10A, the darkest grey portion of the gradient that corresponds to the lowest stress points on the wheel is found on the outermost portion of the wheel 10. This shows the ring 20 and hub 70 experience the least amount of stress. The lightest portion of the gradient on the wheel is found on the hub 70—spoke 71 connection, meaning that said connection experienced the most stress of the wheel elements. However, as described herein, the stress the connection experienced was still minimal even under a large load. As shown in FIG. 10B, the lightest portion of the gradient found on the wheel is on the outer portion of the wheel 10, while under a larger load. This shows the ring 20 may experience some stress under heavy loads, while the hub 70 is relatively stressless.

Figure 10C:
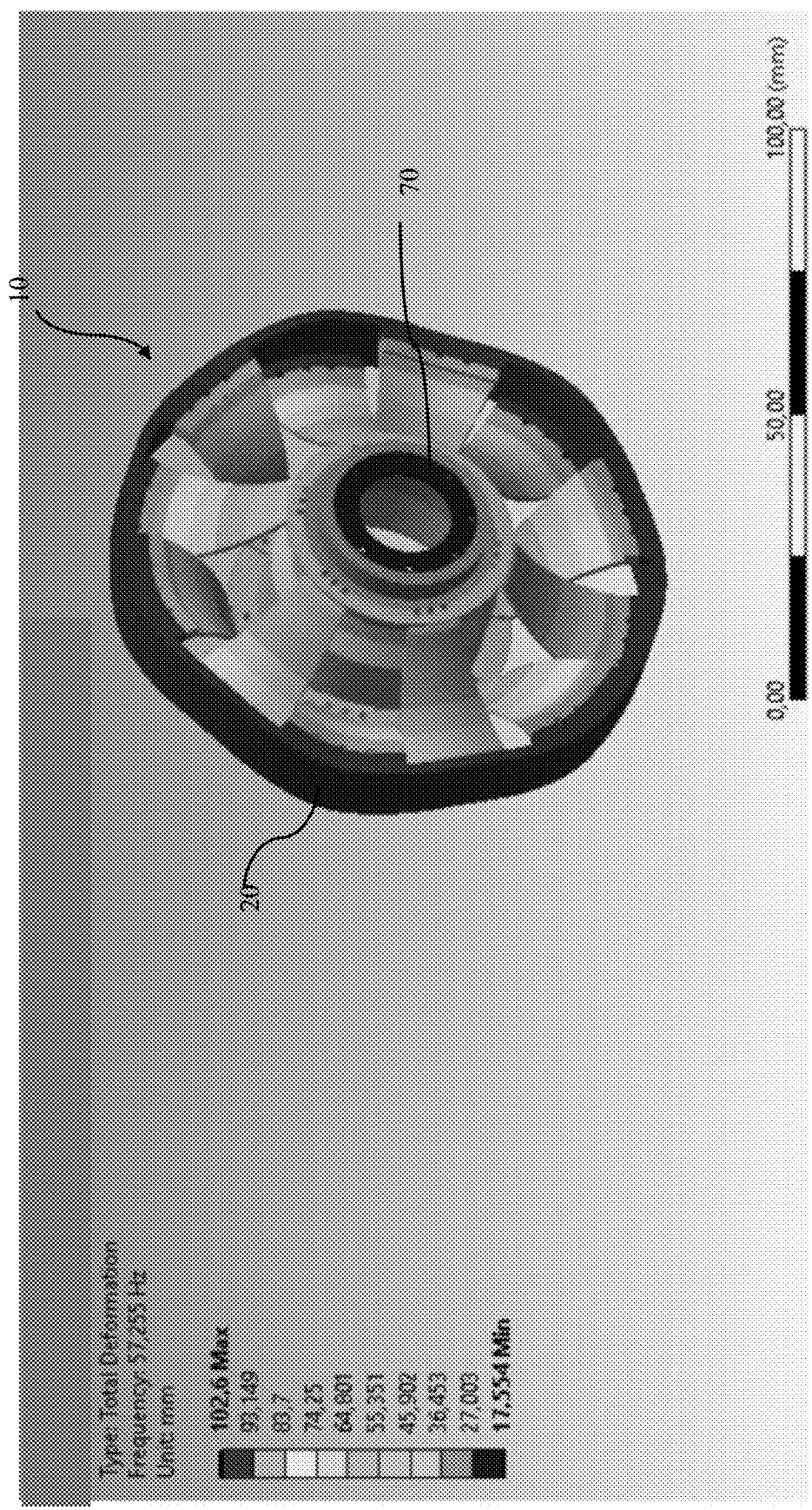
FIG. 10C illustrates a perspective view of the farm irrigation wheel during a vibration simulation, according to an embodiment.

FIG. 10C illustrates a perspective view of the farm irrigation wheel 10 during a vibration simulation, according to an embodiment. It should also be noted that the wheel 10 may further ensure the hub 70 does not experience a large amount of vibration from the system. Through analysis testing, it showed the vibrations stayed near the outer portions of the wheel and did not permeate to the hub 70 of the wheel 10. As shown in FIG. 10C, the vibrations stay towards the outer portion of the wheel 10 and do not reach the hub 70. The wheel 10 was specifically designed to keep the vibration from reaching the hub 70 of the wheel 10. Typically, the hub 70 is where the drivetrain and gearbox sit, which is the first major part to fail on a pivot machine. Furthermore, on-pneumatic wheels typically accelerate the drivetrain's failure. The alternating positions of the spokes, along with their shape further help to ensure the vibrations do not resonate to the center hub 70. The same spoke shape without concavity was also tested in an ansys computer simulation, the results showed the spoke with no concavity had 10× less strength. Furthermore, the spokes 71 with a concave surface 71C may increase the strength approximately by ten times.

Furthermore, as shown in FIG. 10C the darkest grey portion of the gradient that corresponds to the greatest vibrational deformation is found on the outer most portion of the wheel 10. This means the most vibration is experienced near the ring 20 of the wheel 10. The black portion of the gradient is found on the hub 70, meaning the hub 70 experienced the minimum amount of vibration of the wheel 10 elements.

FIG. 11A and FIG. 11B illustrate a perspective view and a cross-sectional view of a lug 50A, respectively, according to an aspect. As described hereinabove, a lug 50A for use in a wheel 10 may be comprised of a center rib 92, a first leg 95A and a second leg 95B, each leg extending from the center rib 92 laterally and opposite of each other, and a lug plate 91 adapted to connect the first leg 95A to the center rib 92. The first leg 95A and second leg 95B may form a W-shape with the centrally disposed center rib 92. In an embodiment, a lug 50A may be provided having a singular lug plate 91 with a rectangular cross section configured to connect one of the lug legs 95 to the center rib 92, but that utilizes two bolts 94 to secure to the ring 20. The lug leg that is connected to the lug plate 91 may be referred to as a first leg 95A, while the other leg may be referred to as a second leg 95B. Both the first leg 95A and the second leg 95B of a lug 50A may each have a flat portion 97 in which a bolt hole 93 is disposed. A bolt 94 may travel through each bolt hole, such as the bolt holes 93 of FIG. 7B, disposed within each of the two flat portions 97 of the lug 50A to secure the lug 50A to the circular ring 20. The usage of two bolts 94 to attach said lug 50A to the ring 20 may be helpful in preventing rotation of said lug 50A after installation, as well as providing greater resistance to being broken off of the wheel, when compared to configurations that have a singular bolt 94. Alternative methods of securing the lugs 50A to the circular ring 20 may also be implemented, including implementing compression fittings, magnets, or other suitable fasteners on the lugs 50A to secure them to the ring 20. Some alternative methods, including welding, may not require the usage or presence of through holes 28 within the circular ring 20, but may increase assembly costs.

An overmolded rubber coat ("overmolded rubber layer", "rubber coat") 110 may be disposed on one or more surfaces of a metal interior frame 100 or may completely surround and encase said metal interior frame 100, in order to further strengthen and protect lug 50A. The metal interior frame 100 may be provided as a singular monolithic component, such as a metal plate, as in FIG. 11A-11B, as one or more separate wires, as in FIG. 7H, or in any other form capable of providing the required structural properties. The overmolded rubber coat 110 may cover only a portion of the lug, such as the bottom surface of the metal interior frame 100, as depicted in FIG. 11A, or may cover the entire metal interior frame 100, as depicted in FIG. 11B. As described hereinabove, an overmolded rubber layer 110 may occupy the interior 99 of the center rib 92 of the lug 50A, such that the bottom surface of the lug 50A is flat between the two flat portions 97 and a solid rubber body is disposed within the center rib 92. The presence of the solid rubber body disposed within the center rib 92 may further increase the strength of said lug 50A.

The different styles of overmolded rubber layer 110 may provide different benefits, depending on which portions of the metal interior frame 100 are covered. As described previously, an overmolded rubber layer that occupies the interior 99 of the center rib 92 may provide a solid body structure within the center rib 92 interior 99, which may increase the strength of the lug 50A and allow it to withstand a greater force without deforming or breaking. Having an overmolded rubber layer provided only on the bottom surface of the lug as described hereinabove may leave the metal interior frame 100 exposed at the top, which may have the advantage of providing a durable external surface that contacts the ground. Alternatively, providing the overmolded rubber layer exclusively on the top surface of the lug, such that the overmolded rubber layer contacts the ground may help increase the friction between the wheel and the ground, enhancing the wheel's grip. The primary purpose of the overmolded rubber layer 110 on the top surface of the lug may be to provide the hereinabove described lug plate 91 to the lug 50A, as the metal interior frame 100 may not have a comparable lug plate structure of its own. This lug plate 91 may help provide greater traction between an attached wheel and a driving surface. Finally, by completely encasing and sealing the metal interior frame 100 within an overmolded rubber layer 110, the advantages of increased structural strength and enhanced wheel grip may both be provided, along with the protection of the enclosed metal interior frame 100 from the external elements, which may help increase the longevity metal interior frame 100.

When implementing an overmolded rubber layer 110 on a lug 50A, the overmolded rubber layer 110 may cover an entire surface of the metal interior frame 100, such that the overmolded rubber layer 110 and metal interior frame 100 have the same length and width. In an embodiment, an overmolded rubber layer 110 disposed on the bottom surface of a metal interior frame 100 may cover the entire bottom surface of said metal interior frame 100, such that the length and width of these two layers are the same, as depicted in FIG. 11A. By implementing an overmolded rubber layer 110 that has the same length and width as the metal interior frame 100 on a lug 50A, an entire surface of the frame metal interior frame 100 may be protected without significantly altering the lug 50A shape. Alternative embodiments in which the overmolded rubber layer 110 completely encases the metal interior frame 100 may require the rubber layer 110 to be slightly wider and longer than the metal interior frame 100 in order to completely encase it, though this slight size differences may not significantly affect the overall shape of the lug 50A. The lugs may be implemented on the wheel in a modular capacity, allowing for easy maintenance, repair or replacement of each lug as needed.

In an embodiment, the overmolded rubber layer 110 may have the same shape as the metal interior frame 100. In such an embodiment, such as the lug 50A of FIG. 11B, the structure of the lug 50A will have the benefit of enhanced structural stability for all elements of the lug 50A, including the legs 95, center rib 92 and lug plate 91. In alternative embodiments, the geometries of the overmolded rubber layer 110 and the metal interior frame 100 may differ. As seen FIG. 7H, the described lug, including the legs 95, center rib 92 and lug plate 91 may be formed by the overmolded rubber layer 110, while the metal interior frame 100 may be comprised of three separate metal wire structures that do not share the disclosed lug shape, as seen in FIG. 7H. Such an embodiment may be useful in limiting the amount of metal needed to form the lug, in applications in which greatly enhanced lug 50A strength is not required or lighter weight lugs are desirable.

In an embodiment, each lug secured to a wheel may have the same dimensions. Each lug may have a 15.75" length, 3.75" width and 3.75" height. With said lug dimensions, a standard farm wheel may fit 30 lugs around the outer surface of the ring of said wheel. The described configuration of this embodiment would be cost effective while fitting within the overall width parameters of the central pivot and lateral move irrigation industries.

Figure 12A:
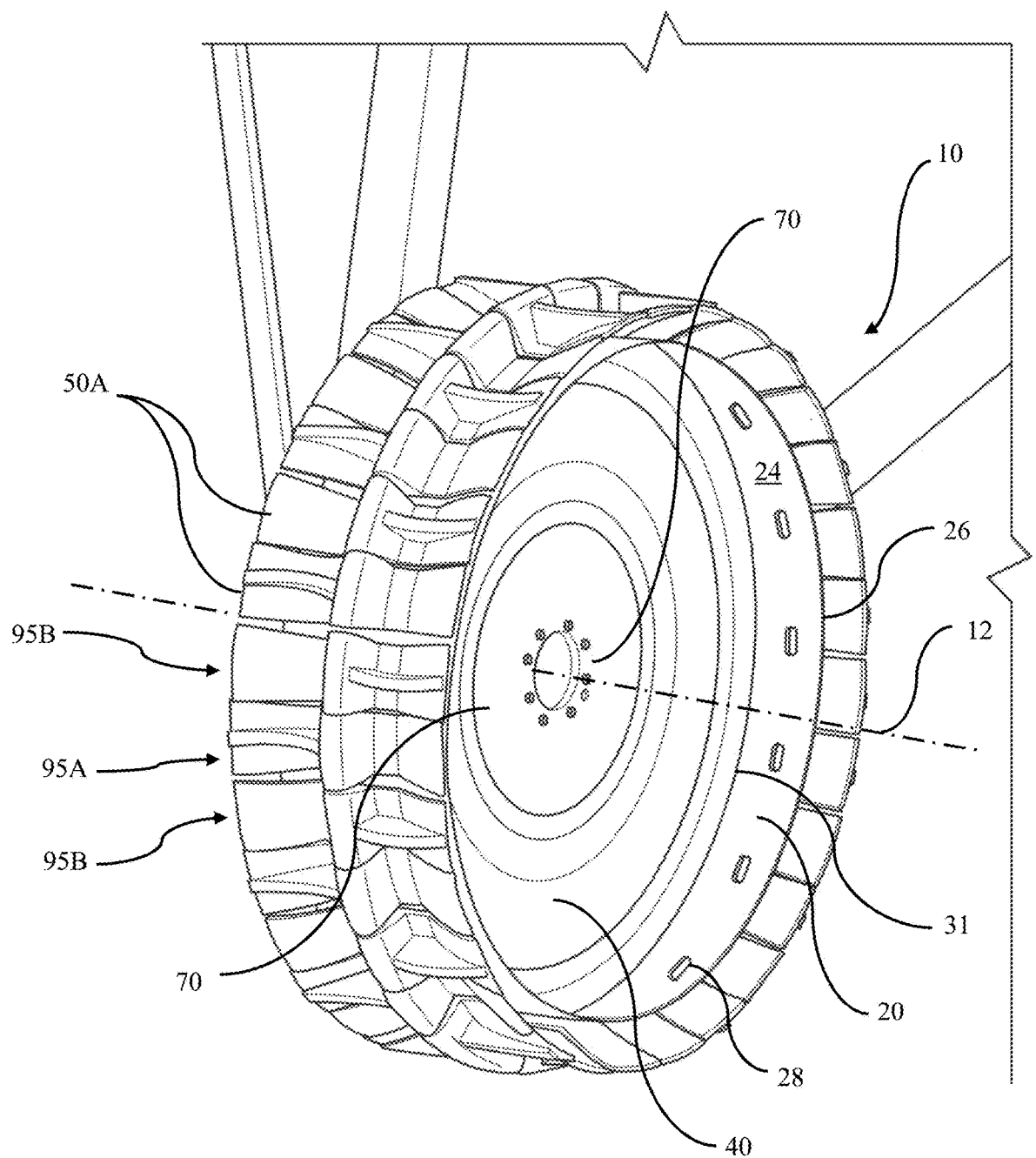
FIG. 12A illustrates a perspective view of a farm irrigation wheel attached to a center pivot irrigation system, according to an embodiment.
Figure 12B:
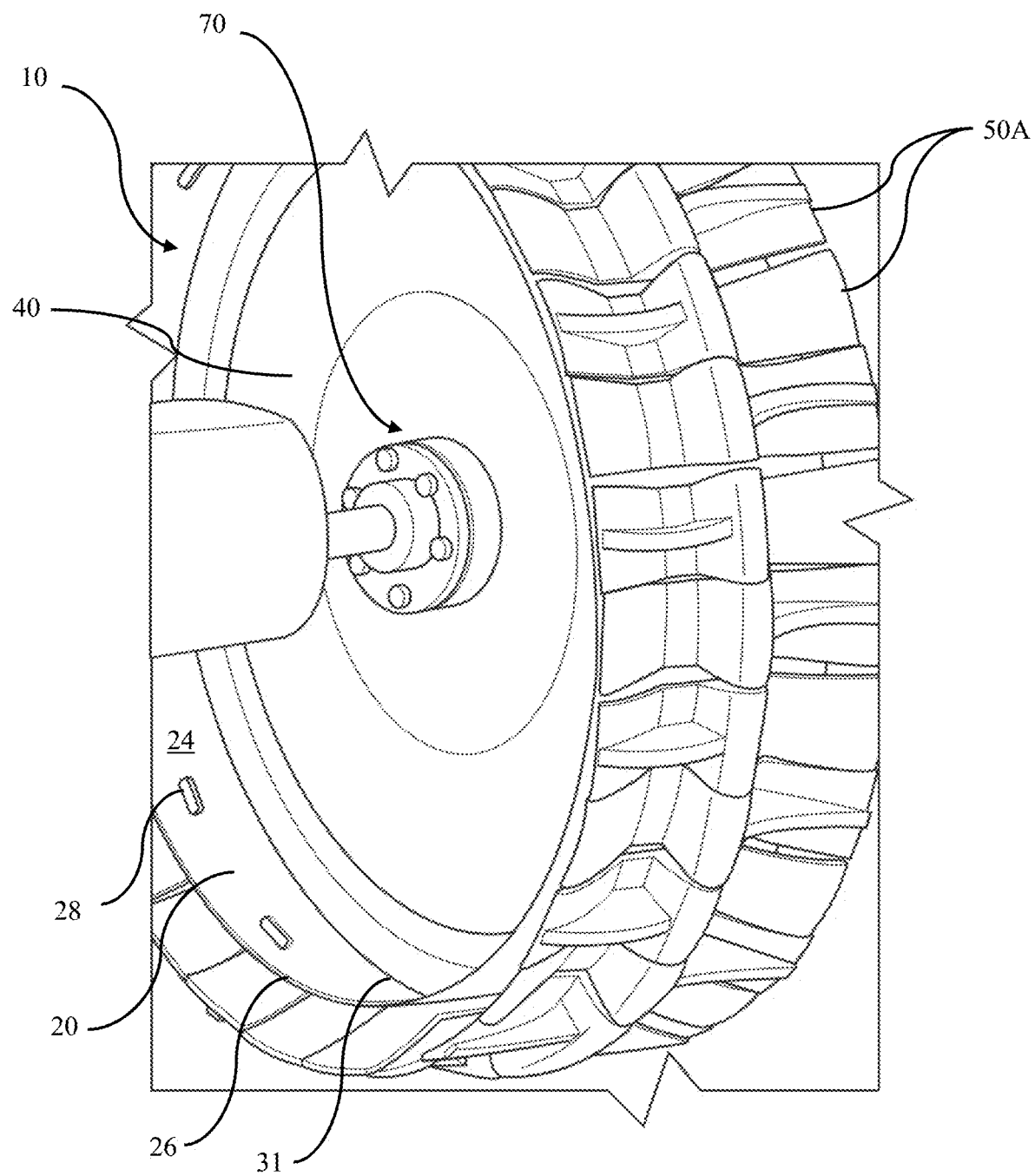
FIG. 12B illustrates a perspective view of a farm irrigation wheel attached to a center pivot irrigation system, according to an embodiment.

FIG. 12A and 12B illustrate perspective views of a farm irrigation wheel 10 attached to a center pivot irrigation system, according to an aspect. In an embodiment, the individual parts of a farm irrigation wheel 10 may include a circular ring 20, a disk 40 disposed within and attached to the circular ring, and a plurality of identical lugs 50A. The wheel 10 may be further comprising of a hub 70 disposed within the disk 40 that is configured to engage with suitable farming equipment. The disk 40 and hub 70 may be formed as a singular monolithic piece, which may help to simplify the wheel's design and enhance the wheel's structural integrity. The circular ring 20 may have an outer surface, such as outer surface 22 of wheel 10 in FIG. 2., on which the lugs 50A are mounted, as well as rotational axis 12 shared with the wheel 10 itself. Unlike the sinusoidally shaped edges of ring 20 described if FIG.9, the pair of opposing edges 26 of ring 20 in FIG. 12A and FIG. 12B of this embodiment are flat, such that ring 20 is cylindrical with level, circular edges 26.

It should be understood that while the opposite side of a wheel 10 may not visible in a specific figure, it can be assumed that said opposite side has the same characteristics as the visible side, unless otherwise noted. The disk 40 may be disposed within the ring 20 and secured or otherwise attached to the inner surface 24 of said ring 20 by the disc's outer perimeter 31, such that the disk 40 is parallel with and positioned equidistantly from both opposing edges 26 of the ring 20. A hub 70 disposed at the center of the disk 40 may be configured to attach a center pivot irrigation system, as shown in FIG. 1A. Each lug 50A may be bolted to the outer surface of ring 20 as described hereinabove. A plurality of through holes 28 may be disposed within the outer surface of ring 20 such that each hole is centered (equidistantly disposed) between the opposing edges 26 of the ring 20, forming a circular pattern around the outer surface of the ring 20 that runs parallel with the opposing edges 26 of ring 20.

Alternatively, two circular patterns of through holes 28 may be disposed within the outer surface of the ring 20, such that each circular pattern of through holes 28 is disposed a fixed distance away from a corresponding opposing edge 26 as well as around the outer surface of the ring 20.

As discussed hereinabove, the positions of the lugs 50A may be determined by the position of through holes 28 disposed on the outer surface of the ring 20. As a result of the circular pattern(s) of the through holes 28, the attached lugs 50A may also be arranged in a circular pattern around the outer surface of the ring 20, wherein each of the plurality of lugs is uniformly centered between the opposing edges 26 and around the circular ring in a circular pattern. The outermost point of each center rib 92 from each lug may form a circular pattern that is coaxial with the rotational axis 12 of the circular ring 20. Similarly, the plurality of lugs 50A themselves may also form a circular pattern around the outer surface 22 of the ring 20, wherein said circular pattern is coaxial with the rotational axis. Said circularly arranged lugs 50A may also be arranged in an alternating pattern, similarly to lug 50B and lug 50C of FIG. 6, with the first leg 95A of each lug disposed between the second legs 95B of the adjacent lugs 50A, but with all lugs 50A arranged circularly around the ring 20, as depicted in FIG. 12A. The lugs 50A may be configured to attach to the other suitable wheels to provide the necessary grip for the desired application.

The wheel depicted in FIG. 12A-12B provides an example of a wheel that may be implemented with the disclosed lugs 50A and is not intended to limit the scope of wheels on which said lugs may be implemented. Alternative wheels that may utilize the disclosed lugs includes the spoke-based wheels described hereinabove, as well as other spoke-based wheels that may suitably support the weight of an attached irrigation system. The disclosed lugs and their variations may be implemented on any wheel structure capable of provided the necessary wheel functionality to the aforementioned irrigation system, including wheels with spokes 71, disks 40, legs or other know wheel centers that connect the circular ring 20 to the irrigation system. As such, a wheel 10 intended for use with a farm irrigation system may be comprised of a wheel center, a circular ring 20 disposed around and attached to the wheel center and a plurality of lugs 50A configured to attach to the circular ring 20. The described wheel center may include a hub 70 or other comparable structure to facilitate the necessary attachment of the wheel to the corresponding piece of equipment. The ring 20 may be described as circular purely on the basis of its side profile, which is typically circular for the majority of wheels in many industries. The outer surface of the circular ring may be provided in a variety of forms, including the sinusoidal and flat edged variants discussed hereinabove, as well as any other form that allows for the maintenance of the circular profile of the ring 20 to enable proper travel of an attached structure.

FIG. 13A-13E illustrates the perspective views of a scalloped farm irrigation wheel ("scalloped wheel") 120, according to an embodiment. The scalloped farm irrigation wheel 120 of FIG. 13A-13E may be comprised of a ring 20, said ring being cylindrical in shape. The ring 20 of the scalloped farm irrigation wheel 120 may have at least one pattern ("set") of sinusoidally arranged through holes 28, such that said through holes 28 are disposed on its outer surface 22, similar to ring 20 of FIG. 9. Unlike ring 20 of FIG. 9, the ring 20 of a scalloped wheel 120 may have flat edges 26 comparable to the flat edges 26 of ring 20 in FIG. 12A, as seen in FIG. 13A-13E. The scalloped farm wheel 120 may be further comprised of a disk 40 nested within the ring 20, said disk 40 having an outer perimeter 31 and a plurality of scalloped portions 121. The term "scalloped portion" 121 may be used to describe the pocket-like, alternating portions positioned on the disk 40, as seen in FIG. 13A-13E. The scalloped portions 121 may be disposed on the outer perimeter 31 of said disk. The outer perimeter 31 of the disk 40 may be configured to directly engage with the inner surface 24 of the ring 20 such that the positioning of each scalloped portion 121 provides sufficient clearance around each through hole 28 on the ring 20 to allow for easy installation and removal of wheel lugs using an appropriate tool. As can be seen in FIG. 13A-13E, the scalloped portions are configured to provide space around any through holes adjacent to said scalloped portions 121 to ease the process of installing or removing lugs from the scalloped wheel. The disk 40 having scalloped portions 121 may be secured to the ring 20 by welding or other suitable methods, or monolithically integrated into the ring 20 during manufacturing, such that disk 40 and ring 20 form a singular unified structure.

The scalloped portions 121 disposed on the disk 40 may cause the outer perimeter 31 of said disk 40 to have a reciprocating lateral offset between the edges 26 of the ring 20 that provides an increased contact surface between the disk 40 and ring 20, when compared to the previously disclosed disks 40 that lack said scalloped portions 121. This increased contact surface between the disk 40 and ring 20 may increase the structural integrity of the scalloped wheel 120 and allow it to withstand greater loads without becoming damaged or deformed. This reciprocating lateral offset of the outer perimeter 31 of the disk 40 may be similar to the arrangement of lugs described for FIG. 4, in which the engagement surface between the outer surface 31 of the disk 40 and the ring 20 may execute a roughly sinusoidal curve having an amplitude and a period. This roughly sinusoidal curve of the engagement surface between the outer perimeter 31 of the disk 40 and the ring 20 may be coaxial with the rotational axis 12 of the wheel. By having a disk 40 that roughly follows the same pattern as the through holes 28 and any attached lugs (e.g., a sinusoidal pattern), said disk 40 may provide ample support to a central portion of each attached lug, thus providing greater structural integrity to the scalloped wheel 120 when compared to alternative configurations in which the disk 40 does not follow the same pattern as the through hole 28, and thus any attached lugs.

The reciprocating lateral offset of the outer perimeter 31 may result in the distance between the outer perimeter 31 and each edge 26 of the ring 20 being varied in accordance with the positioning of the nearby through holes 28, which will be described in greater detail hereinbelow. The "lateral" direction in the context of the "reciprocating lateral offset" may refer to the direction defined by the rotational axis 12 of the wheel. A hub 70 may be disposed within and secured to the disk 40, wherein said hub 70 is configured to engage with the drivetrain of a suitable vehicle assembly. Much like the prior disclosed wheels 10, the disclosed scalloped wheel 120 may be configured to rotate about a wheel rotational axis 12 to facilitate vehicle movement.

In order to more easily accommodate installation/removal of lugs, such as lug 50A of FIG. 12A, on the hereinabove described scalloped wheel 120, the orientation and positioning of the scalloped portions 121 disposed on the disk 40 may be configured such that the disk 40 avoids blocking or impeding access to each through hole 28 of each pattern or set of sinusoidally arranged through holes on the ring 20. This may be done by having the scalloped portions 121 arranged on the disk 40 such that the engagement surface between the outer perimeter 31 of the disk 40 and the ring 20 is sufficiently distant from each through hole 28 on the ring 20, such that an appropriate tool, such as a socket wrench or torque wrench, may be easily maneuvered near the through hole 28 to fasten/remove a bolt, screw or other comparable fastener, securing a lug to the ring 20, without having the disk 40 block or otherwise impede the utilization of said tool. As can be seen in FIG. 13A-13E, the ring 20 may have two adjacent sets of sinusoidally arranged through holes 28 wherein said sets of sinusoidally arranged through holes 28 are configured to engage with a plurality of lugs, such as lug 50A of FIG. 7D, and each lug is configured to attach to the ring 20 using two bolts 94. The two adjacent sets of sinusoidally arranged through holes may be arranged such that a sinusoidal pattern defined by each set is in phase with the sinusoidal pattern of the other set. Both sets being "in phase" with each other would indicate that the maximum and minimum lateral offsets toward a specific edge 26, and thus the maximum amplitude/minimum amplitude of each sinusoidal pattern, would occur at the same radial angles of the wheel for both sets, as can be seen in FIG. 13A-13E.

Each lug may be configured to engage with a singular through hole 28 from each set of sinusoidally arranged through holes 28, such that upon installation, each lug is parallel with adjacent lugs, as seen in FIG. 6. Much like the arrangement of lugs in FIG. 4, any lugs secured to the scalloped wheel 120 may be positioned on the outer surface of the ring 20 in laterally offset positions (see FIG. 5) with respect to each other to form a continuously and possibly smoothly varying locus of the central points, wherein said lugs form a sinusoidal pattern around the ring 20 of the scalloped wheel 120. As can be seen by the scalloped wheel 120 of FIG. 13A-13E, the scalloped portions 121 of the disk 40 may be configured such that the engagement surface between the ring 20 and disk 40 is always disposed between corresponding adjacent through holes of the two adjacent sets of sinusoidally arranged through holes 28. In such an embodiment, the positioning of the scalloped portions 121 may provide sufficient clearance around each bolt (not shown) traveling through each through hole 28, thus making it easier to utilize tools configured to ease the installation and uninstallation of lugs to and from the ring 20.

Figure 13A:
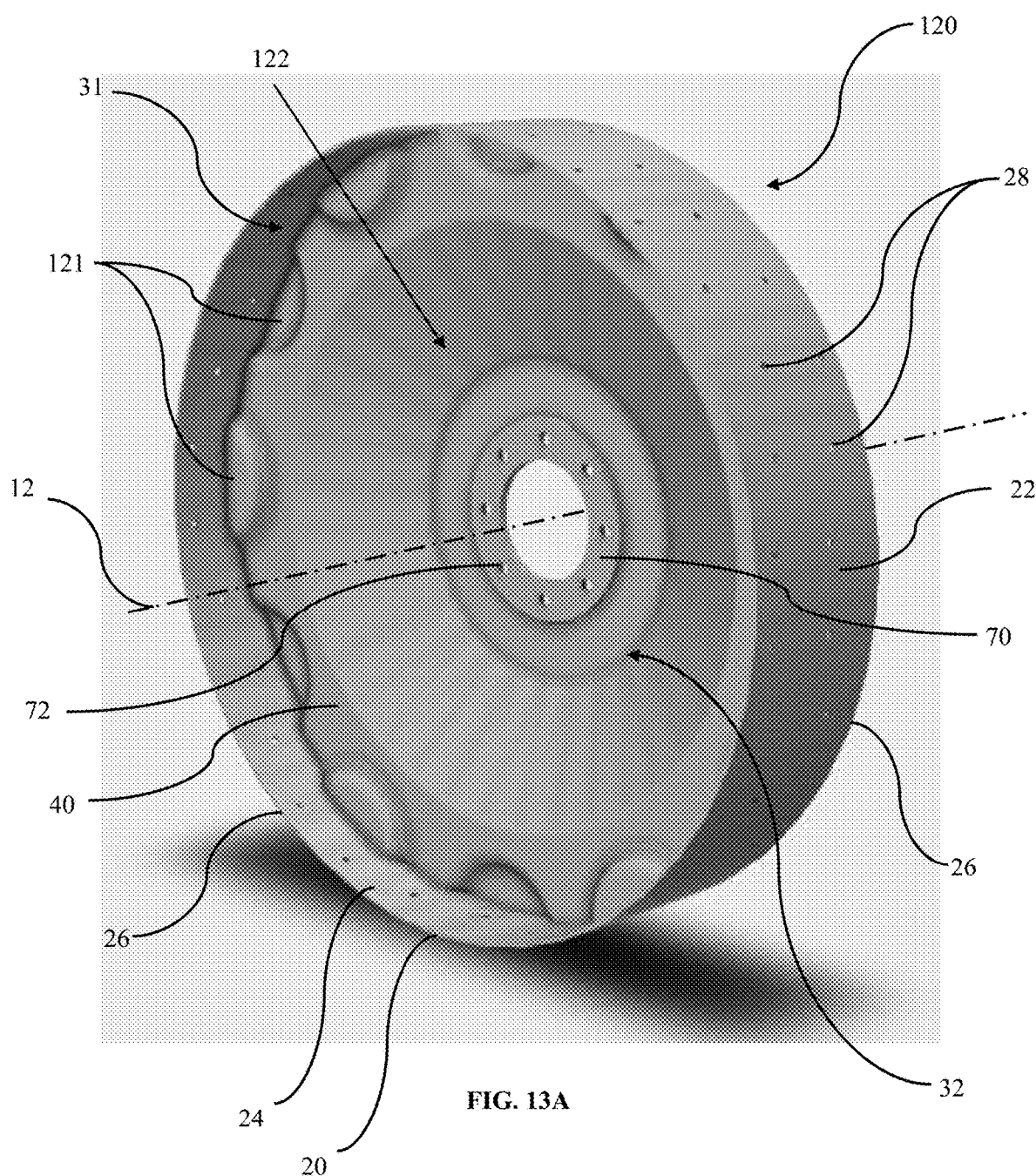
FIGS. 13A-13E illustrates the perspective views of a scalloped farm irrigation wheel, according to an embodiment.
Figure 13B:
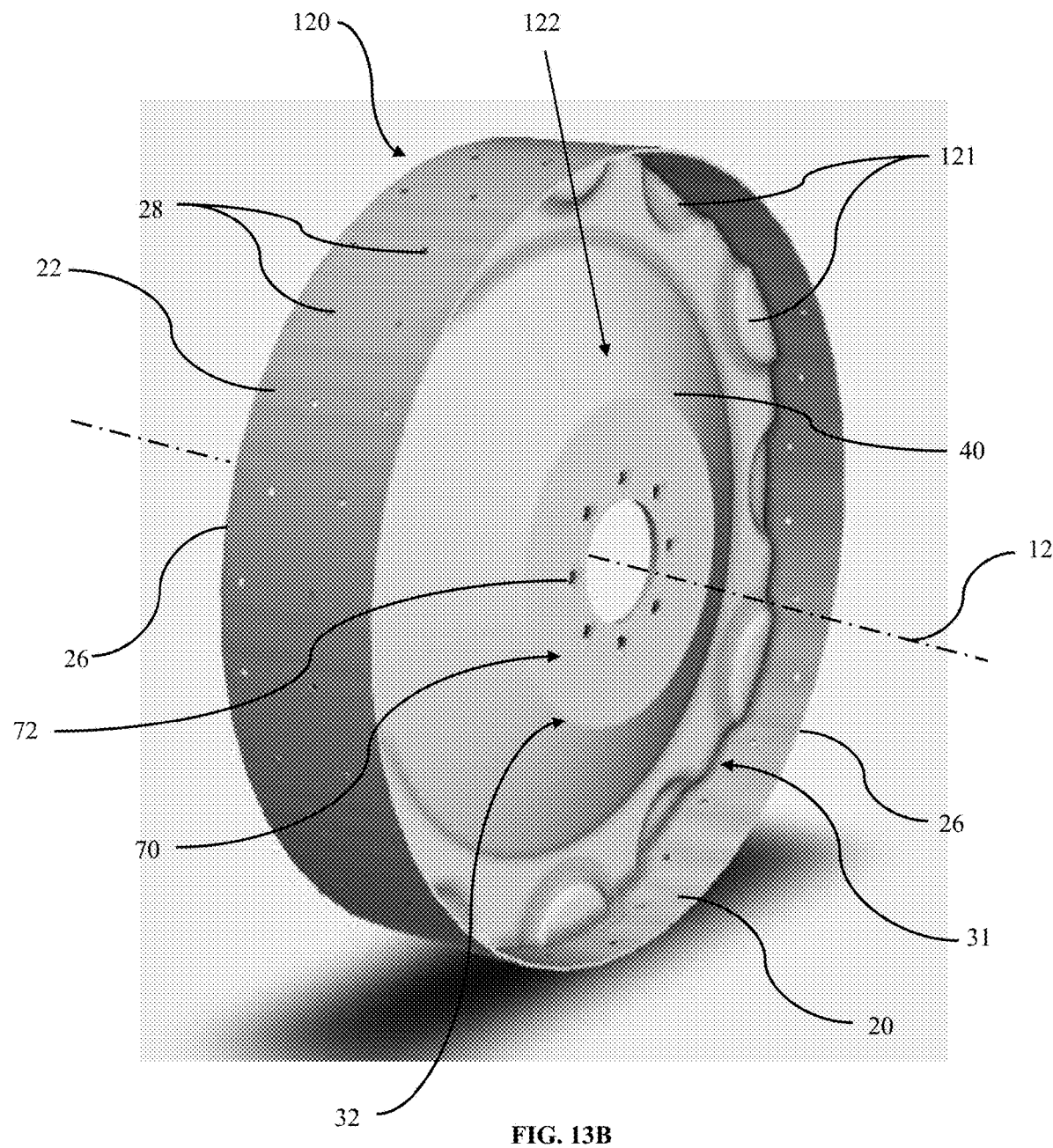

It should be understood that modifications to the positioning and size of the scalloped portions 121 on the disk 40 of a scalloped wheel 120 may be made in order to ease lug installation for alternative scalloped wheel configurations. For example, an alternative scalloped wheel 120 may have a singular set of sinusoidally arranged through holes on its ring 20, similarly to how the through holes 28 are arranged on the ring 20 of FIG. 9, but wherein said ring 20 has flat edges 26. If a flat disk, such as disk 40 of wheel 10 in FIG. 12A, were utilized in a wheel having a singular set of sinusoidally arranged through holes 28, a portion of the through holes 28 may be blocked by the positioning of said disk 40 or said through holes may have insufficient surrounding clearance around them to allow for proper utilization of a tool for lug manipulation. The scalloped portions 121 may be selectively positioned on the disk 40 to avoid said the disk 40 from blocking said through holes 28, similarly to what is seen in FIG. 13A, by having the scalloped portions 121 laterally offset the outer perimeter 31 of the disk 40 such that the engagement of the outer perimeter 31 of the disk 40 with the ring 20 leaves sufficient clearance around the each through hole 28.

As described hereinabove, the outer perimeter 31 of the scalloped disk 40 of FIG. 13A-13E may have a reciprocating lateral offset that is roughly sinusoidal as a result of the positioning of the scalloped portions 121, and thus may need to engage with the ring 20 such that the roughly sinusoidal pattern of the outer perimeter 31 of the disk 40 does not block or otherwise impede access to any through holes. In order to facilitate this engagement, the roughly sinusoidal pattern of the outer perimeter 31 may be sufficiently laterally offset and in-phase with the singular sinusoidal pattern of the through holes 28 in this alternative embodiment. It should be understood that the scalloped disk 40 may be associated with the lugs within a wheel assembly, due to the fact that the scalloped disk 40 and lugs may both be secured to the ring 20 of the scalloped wheel 120.

The disclosed hub 70 of the scalloped wheel 120 may be configured to suitably engage with the drivetrain of a center pivot irrigation system. Said hub 70 may be secured within an inner perimeter 32 of the disk 40, through welding or comparable methods, or monolithically integrated into the disk 40. The disclosed scalloped wheel 120 may be compatible with two common size variants of drive units utilized in the industry, including short shaft drive unit and long shaft drive unit variants. As a result of both of these drivetrain variants having the same stud pattern, the disclosed stud through holes 72 in the hub 70 of the disclosed scalloped wheel 120 may be suitably arranged to allow engagement of said scalloped wheel 120 with either drivetrain variant. The disclosed scalloped wheel 120 may be provided with a built-in lateral offset 122 between the hub 70 and the ring 20 that provides lateral clearance between the scalloped wheel 120 and drive unit of the short shaft drivetrain variant (not shown) and prevents the scalloped wheel 120 and said drive unit from colliding during operation. It should be understood that the term "built-in lateral offset" is referring to the lateral displacement (e.g., positioning along the wheel rotational axis 12) of the hub 70 when compared to a central portion of the ring 20, wherein said central portion of the ring 20 is centrally disposed between the edges 26 of the said 20. This built-in lateral offset 122 provides an even greater clearance between the scalloped wheel 120 and the drive unit of the long shaft drivetrain variant, thus ensuring proper wheel 120 operation. The capability of the disclosed scalloped wheel 120 of FIG. 13A-13E to be utilized with either of the two driveshaft lengths (short or long) used in the industry simplifies the manufacture of said scalloped wheel 120 to a singular design for use with both described drivetrain variants.

The disclosed disk 40 of the scalloped wheel 120 may be configured to allow the scalloped wheel 120 to greatly resist deformation and damage while bearing a heavy load. As a result of the solid, unified disk 40 design and the reciprocating lateral offset of the outer perimeter 31 of said disk 40, and thusly the laterally reciprocating interface between the disk 40 and the ring 20 of the scalloped wheel 120, said scalloped wheel 120 may be capable of supporting heavier loads than wheels that utilize spokes or flat disks 40 to attach the wheel hub 70 to the ring 20. The reciprocating interface that results from the reciprocating lateral offset of the outer perimeter 31 of the scalloped disk 40 provides a greater interface area between disk 40 and the ring 20 when compared to prior disclosed flat disks, thus enhancing the structural integrity and load bearing capabilities of the scalloped wheel 120. Similarly to the prior disclosed spokes 71 of FIG. 6, the disclosed scalloped portions 121 may also help increase each scalloped wheel's engagement with the ground while the wheel is partially submerged in softer soil, as a result of the shape of each scalloped portion increasing the attached wheel's surface area, thus increasing the scalloped wheel's traction with the ground when submerged. For example, each scalloped portion 121 may act like a paddle to help grip into the soil and dig out the scalloped wheel 120 when it is submerged in soft or loose soil.

It should be understood that the disclosed scalloped disk 40 of FIG. 13A-13E having scalloped portions 121, and thus a reciprocating outer perimeter 31, may be utilized within any of the rings 20 disclosed herein, as long as the interface between the scalloped disk 40 and the ring 20 is appropriately configured to provide sufficient clearance around each through hole 28 on said ring 20 to allow for suitable access to the lugs for installation or uninstallation. The disk 40 and ring 20 of the disclosed scalloped wheel 120 may be secured to each other through the usage of welding or other suitable attachment methods known in the industry. The disclosed scalloped wheel 120, as well as each of the hereinabove described wheels 10, may also be manufactured as a monolithic body through manufacturing techniques such as injection molding. As with all wheels 10 described herein, the disclosed parts and components of scalloped wheel 120 may be made of metal or other known materials having suitable tensile strength, elasticity, flexibility and other characteristics to achieve the wheels intended purpose. The disclosed configuration of the scalloped disk 40 seen in FIG. 13A-13E may be desirable in applications that require a wheel having enhanced load bearing capabilities and maintaining said wheel's ability to provide traction when partially submerged in looser soil, while ensuring the disk 40 leaves sufficient clearance around each through hole 28.

Figure 13C:
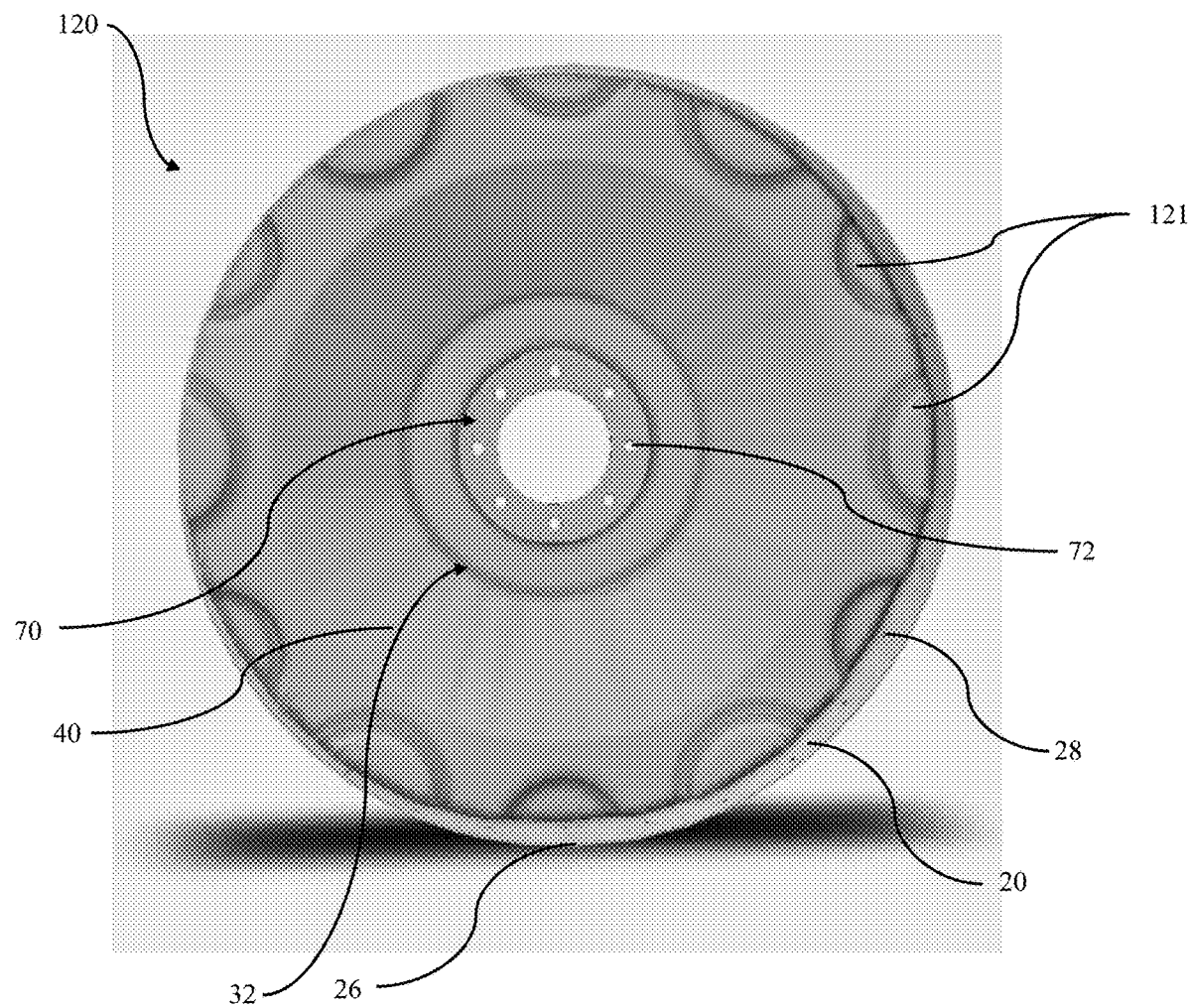
Figure 13D:
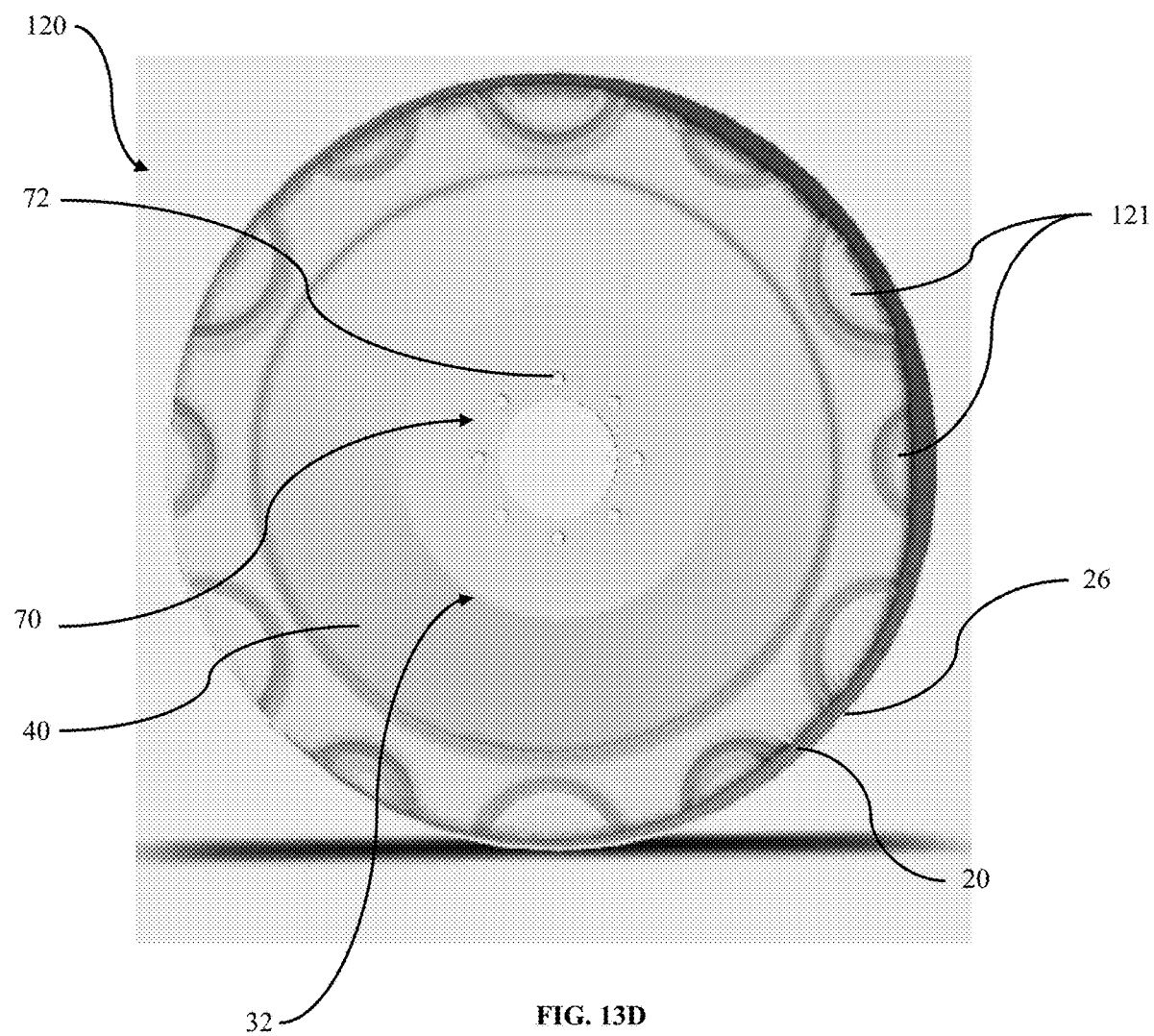
Figure 13E:
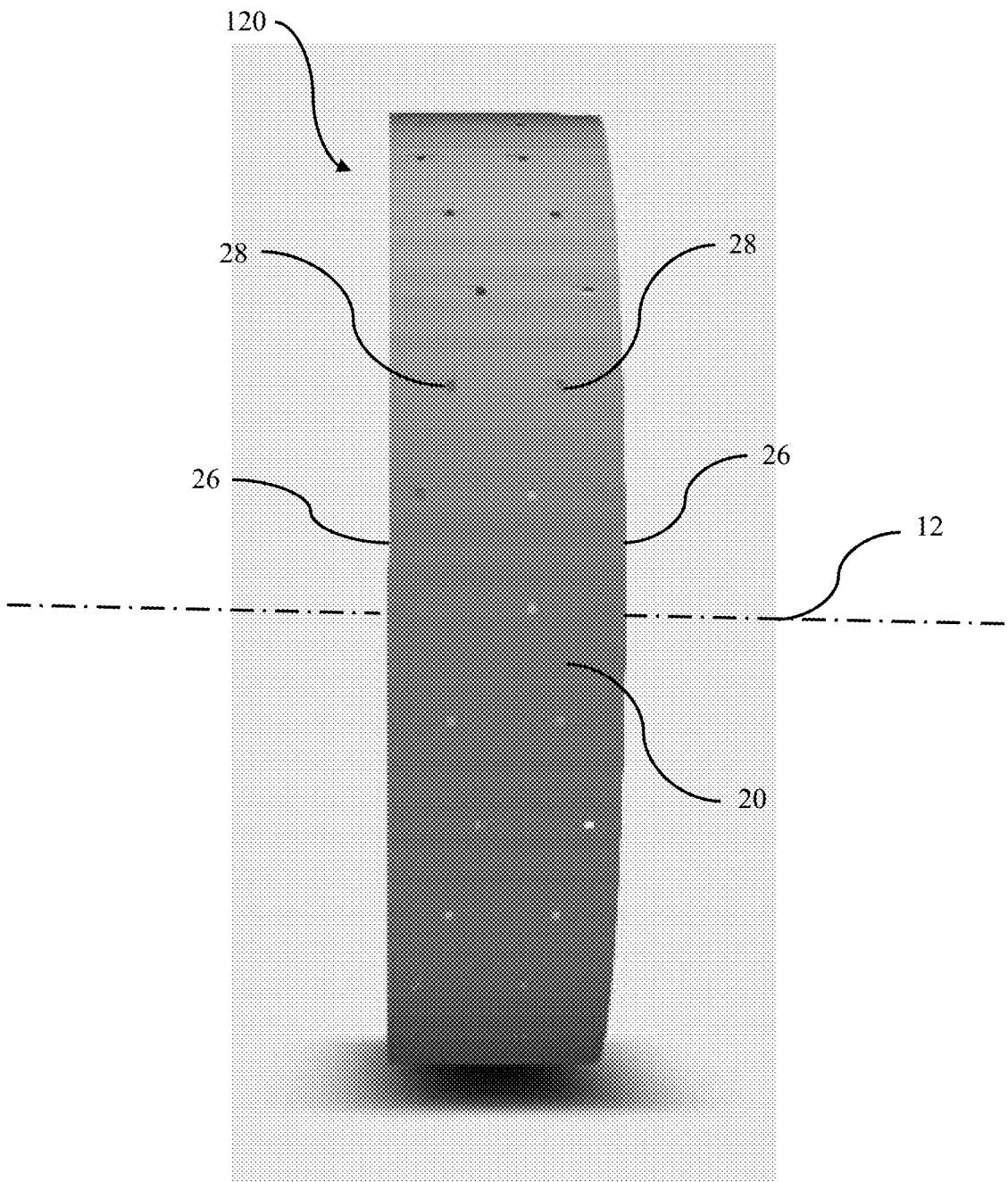

It should be understood that the term "circular pattern" may also be used to describe the through hole 28 arrangement, and thus a resulting lug arrangement, depicted in FIGS. 13A-13E, wherein the through holes 28 are arranged sinusoidally around the outer surface 22 of the ring 20 such that said arrangement is depicted as circular from a side profile view, similarly to what is seen in FIGS. 13C-13D, and sinusoidal from a front profile view, similarly to what is seen in FIG. 13E. It should also be understood that the term "circular pattern" may be used to describe the type of lug arrangement (and corresponding through hole 28 arrangement) depicted in FIGS. 12A-12B, wherein the lugs 50A, and thus the corresponding through holes 28, are arranged linearly around the outer surface of the ring 20, such that said arrangement is depicted as circular from a side profile view and linear from a front profile view. The pattern of through holes 28 depicted in FIGS. 9 and 13A-13E, and thus the pattern of the correspondingly attached lugs, may be more specifically referred to as a "sinusoidal pattern". Similarly, the pattern of lugs 50A depicted in FIGS. 12A-12B, and thus the corresponding pattern of through holes 28 used to secure them, may be more specifically referred to as a "linear pattern". As such, both the "sinusoidal pattern" and the "linear pattern" described herein should be understood to be different types of "circular patterns".

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. A wheel comprising:
   a circular ring having:
      an outer surface;
      a rotational axis; and
      a plurality of through holes disposed on the outer surface that form a sinusoidal pattern around the outer surface, the sinusoidal pattern being coaxial with the rotational axis; and
   a plurality of lugs mounted in side-by-side positions on said outer surface of the circular ring, each lug having:
      a center rib, a first leg and a second leg, each leg extending from the center rib laterally and opposite of each other, and a lug plate adapted to connect the first leg to the center rib;
   wherein the plurality of lugs forms a circular pattern that is coaxial with the rotational axis.

2. The wheel of claim 1, wherein said circular pattern is a sinusoidal pattern.

3. The wheel of claim 1, wherein the plurality of lugs is disposed in an alternating pattern, such that the first leg of each lug is disposed between the second legs of adjacent lugs.

4. The wheel of claim 1, wherein each lug of the plurality of lugs has an overmolded layer of rubber.

5. The wheel of claim 1, further comprising a disk nested within the circular ring, said disk having a plurality of alternating scalloped portions on an outer perimeter of said disk.

6. The wheel of claim 5, wherein the scalloped portions are configured to provide clearance around each through hole of a plurality of through holes disposed on the outer surface of the ring.

7. A wheel comprising:
   a ring having;
      an outer surface;
      a rotational axis; and
      a plurality of through holes disposed on the outer surface that form a sinusoidal pattern around the outer surface, the sinusoidal pattern being coaxial with the rotational axis; and
   a plurality of lugs mounted in side-by-side positions on the outer surface of the ring,
   wherein the plurality of lugs forms a circular pattern that is coaxial with the rotational axis.

8. The wheel of claim 7, wherein the plurality of lugs is disposed in an alternating pattern such that a first leg of each lug is disposed between second legs of adjacent lugs.

9. The wheel of claim 7, further comprising a disk associated with the plurality of lugs, said disk having a plurality of scalloped portions.

10. A lug for use in a wheel, the lug comprising:
    a center rib;
    a first leg and a second leg, each leg extending from the center rib laterally and opposite of each other; and
    a lug plate adapted to connect the first leg to the center rib;
    wherein the lug has an overmolded layer of rubber.

11. The lug of claim 10 further comprising a bolt hole disposed within a planar portion of first leg and a bolt hole disposed within a planar portion of the second leg.

12. The lug of claim 10, further comprising a bolt hole disposed within a center of the lug.

13. The lug of claim 10, further comprising an additional lug plate adapted to connect the second leg to the center rib.

14. The lug of claim 10, further comprising a cutout disposed within each lug plate.

15. The lug of claim 10, wherein each lug plate has a triangular cross section.

16. The lug of claim 10, wherein the first leg and second leg form a W-shape with the center rib.

17. The lug of claim 10, wherein the lug is made of rubber and reinforced by an internally disposed metal interior frame.

18. The lug of claim 17, wherein the metal interior frame is a singular, monolithic structure.

* * * * *